(12) United States Patent
Moidu

(10) Patent No.: US 8,274,722 B2
(45) Date of Patent: Sep. 25, 2012

(54) COUNTER-BALANCED MEMS MIRROR WITH HIDDEN HINGE

(76) Inventor: Abdul Jaleel K. Moidu, Nepean (CA)

( * ) Notice: Subject to any disclaimer, the term of this patent is extended or adjusted under 35 U.S.C. 154(b) by 332 days.

(21) Appl. No.: 12/652,073

(22) Filed: Jan. 5, 2010

(65) Prior Publication Data

US 2010/0103494 A1    Apr. 29, 2010

Related U.S. Application Data

(63) Continuation-in-part of application No. 12/353,475, filed on Jan. 14, 2009, now Pat. No. 7,952,778.

(60) Provisional application No. 61/021,083, filed on Jan. 15, 2008.

(51) Int. Cl.
*G02B 26/08* (2006.01)
(52) U.S. Cl. .................................................... 359/224.1
(58) Field of Classification Search .... 359/223.1–226.1, 359/290, 291, 871, 872
See application file for complete search history.

(56) References Cited

U.S. PATENT DOCUMENTS

| | | | |
|---|---|---|---|
| 5,212,582 A | 5/1993 | Nelson | 359/224 |
| 6,533,947 B2 | 3/2003 | Nasiri et al. | 216/2 |
| 6,535,319 B2 | 3/2003 | Buzzetta et al. | 359/225 |
| 6,934,439 B2 | 8/2005 | Mala et al. | 385/18 |
| 6,968,101 B2 | 11/2005 | Miller et al. | 385/18 |
| 7,010,188 B2 | 3/2006 | Miller et al. | 385/18 |
| 7,355,317 B2 * | 4/2008 | Greywall | 359/225.1 |
| 2007/0236775 A1 | 10/2007 | Miller et al. | 359/291 |

OTHER PUBLICATIONS

Jung et al, High Fill-Factor Two-Axis Gimbaled Tip-Tilt-Piston Micromirror Array Actuated by Self-Aligned Vertical Electrostatic Combdrives in the Journal of Microelectromechanical Systems, vol. 15, No. 3, pp. 563 to 571, Jun. 2006.

* cited by examiner

*Primary Examiner* — Euncha Cherry
(74) *Attorney, Agent, or Firm* — Teitelbaum & MacLean; Neil Teitelbaum; Doug MacLean

(57) ABSTRACT

A multi-layer hidden hinge and actuator design for high fill factor biaxial MEMS mirror array for wavelength selective switches (WSS) based on a silicon-on-insulator (SOI) process with wafer bonding and coarsely aligned orthogonal vertical comb and/or parallel plate actuator. The present invention relates to a micro-mirror in a MEMS linear piano micro-mirror array comprising a micro-mirror layer, a hinge layer and an electrode/substrate layer. The structure is formed by fabricating the layers separately in SOI structure and then bonding them together.

10 Claims, 32 Drawing Sheets

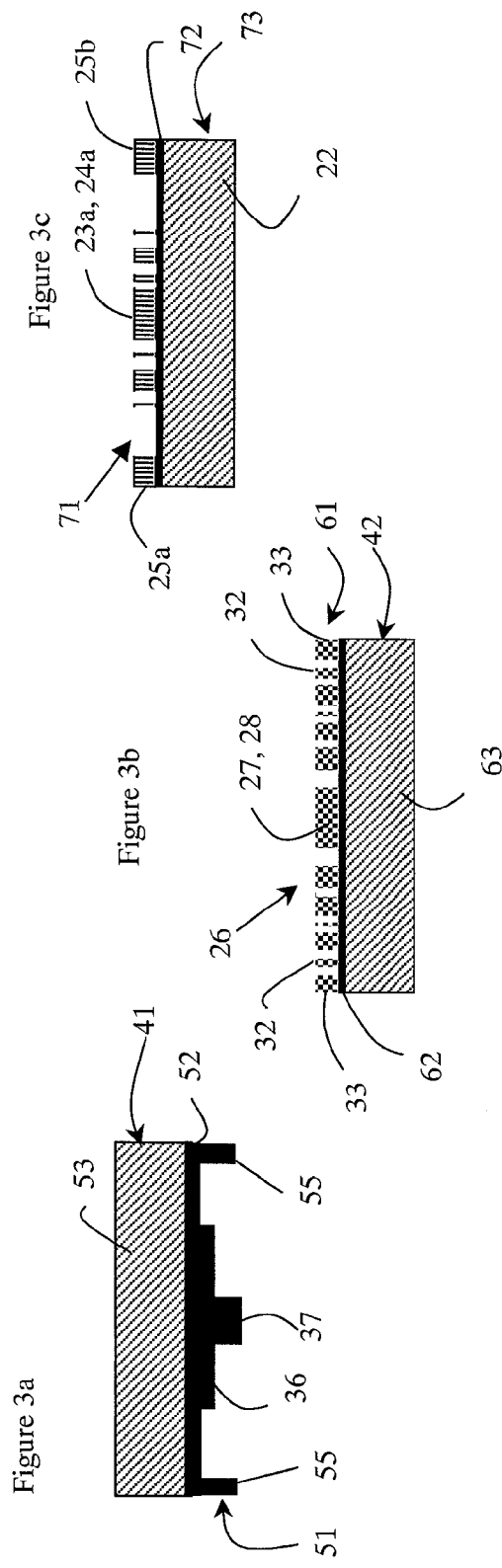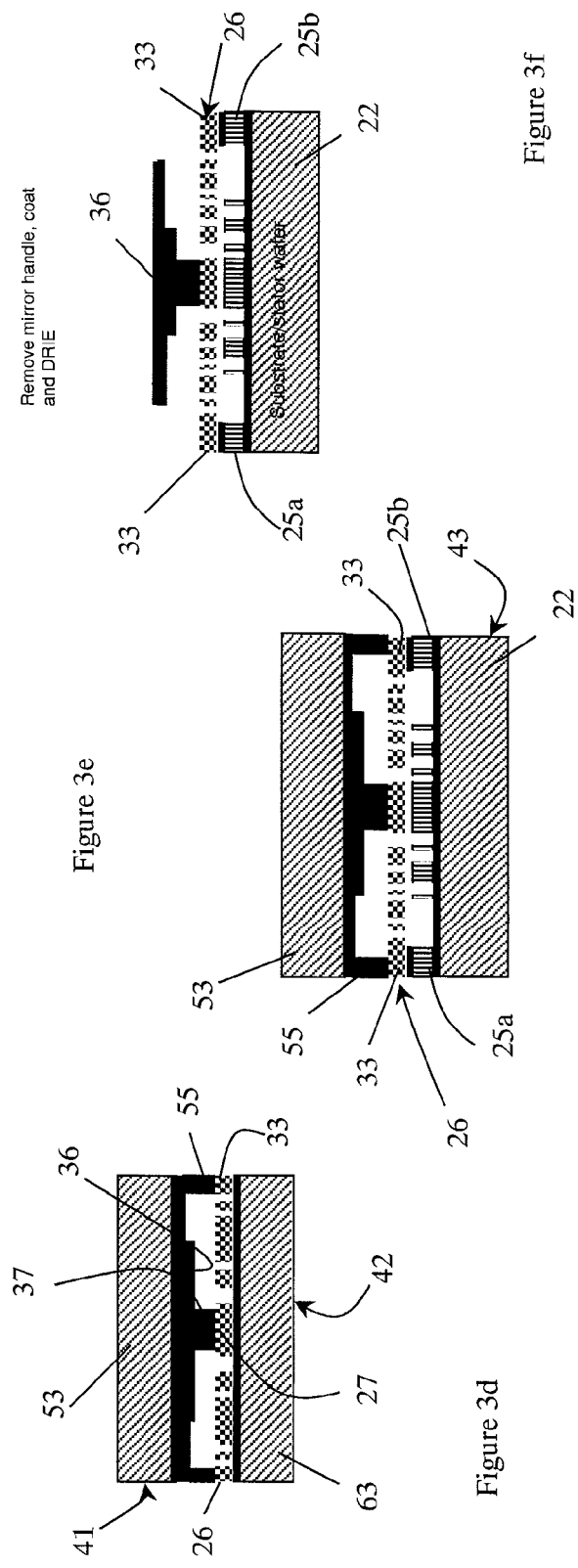

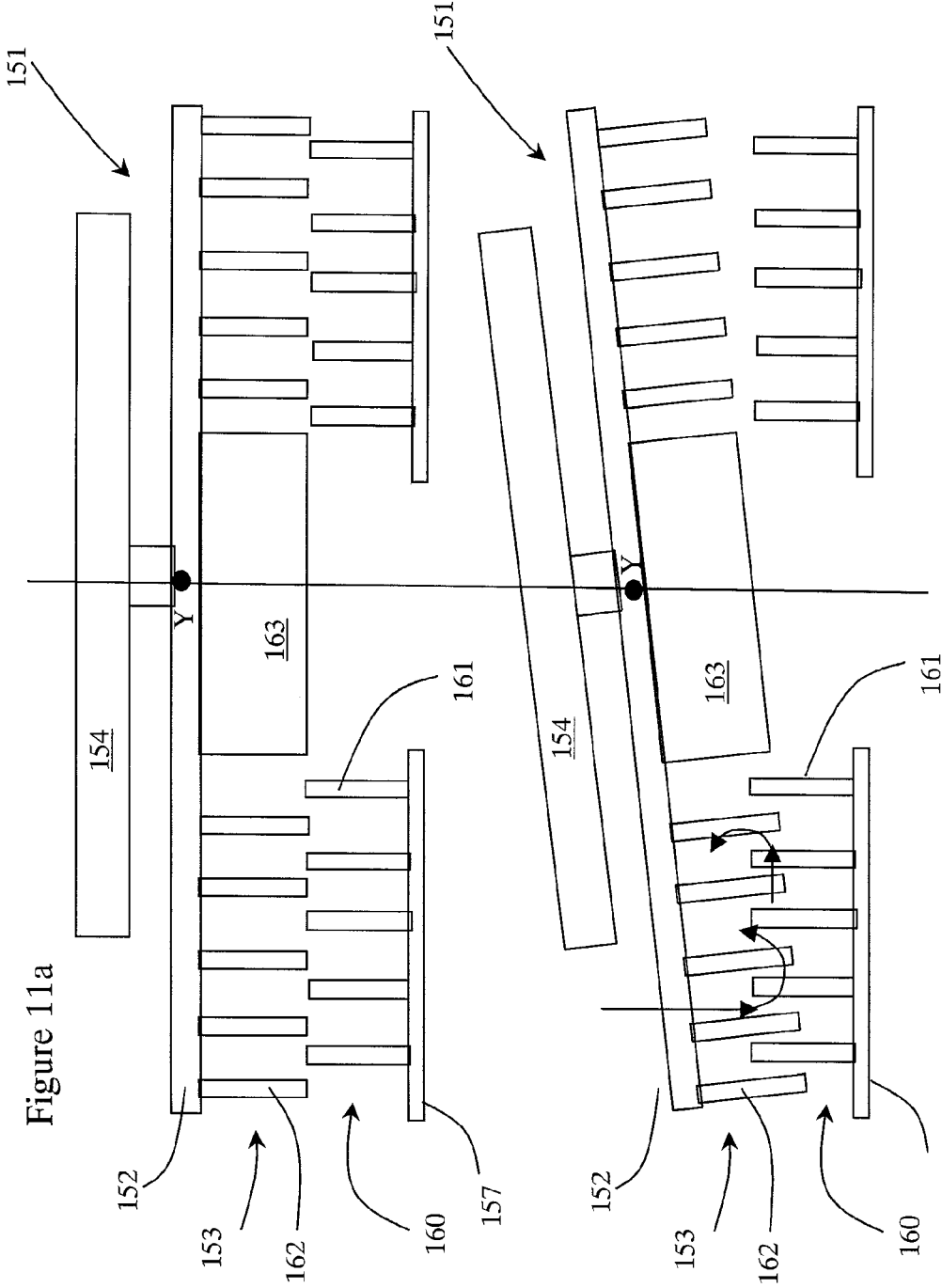

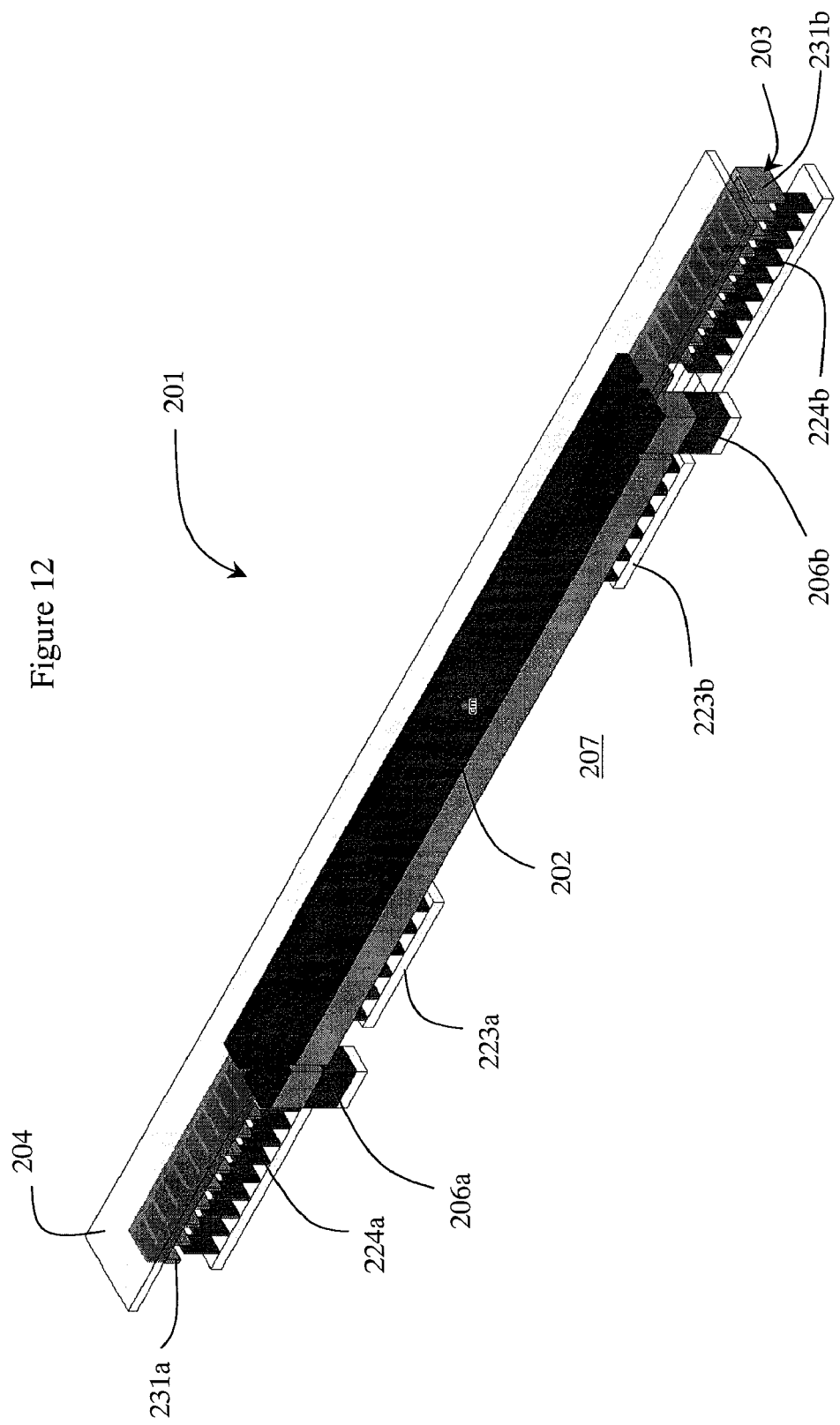

COUNTER-BALANCED MEMS MIRROR WITH HIDDEN HINGE

CROSS-REFERENCE TO RELATED APPLICATIONS

The present application is a continuation in part of U.S. patent application Ser. No. 12/353,475, filed Jan. 14, 2009 now U.S. Pat. No 7,952,778, which claims priority from U.S. Patent Application No. 61/021,083, filed Jan. 15, 2008, which are incorporated herein by reference.

TECHNICAL FIELD

The present invention relates to a multi-layer stacked micro-electro-mechanical (MEMS) mirror, and in particular to a MEMS mirror with the hinges and the actuator fabricated in a separate layers underneath the mirror to counterbalance the weight of the mirror, preferably using a staggered orthogonal vertical comb drive actuator that requires only a coarse alignment of comb fingers. The design is equally applicable for parallel plate and comb drive actuators or a combination of comb and parallel plate actuators.

BACKGROUND OF THE INVENTION

Conventional hidden hinge MEMS mirrors, such as those disclosed in U.S. Pat. No. 5,212,582 issued May 18, 1993 in the name of William Nelson, and U.S. Pat. No. 6,535,319 issued Mar. 18, 2003 in the name of Victor Buzzetta et al, include a mirror mounted on the end of a pedestal, extending from a substrate, which are rotatable about a single axis and actuated by electrodes patterned on the substrate below each side of the mirror. In an effort to provide biaxial rotation, Nasiri et al, disclose a MEMS mirror with a complicated hidden lever system, in U.S. Pat. No. 6,533,947 issued Mar. 18, 2003. Unfortunately, the device disclosed in Nasiri et al requires four independent levers and four sets of electrodes equally spaced 90° from each other beneath the mirror, thereby requiring a mirror with a large surface area. Furthermore, an array of such mirrors could not be tightly packed together for reflecting individual wavelengths of light, which has been dispersed in an optical switch. Piano-MEMS micromirrors, which tilt about two perpendicular axes and can be tightly packed together, are disclosed in U.S. Pat. No. 6,934,439 issued Aug. 23, 2005 in the name of the present Applicant. A hidden hinge version of the piano-MEMS micromirrors is disclosed in United States Patent Publication 2007/0236775 published Oct. 11, 2007 in the name of the present Applicant. The aforementioned piano-MEMS devices pivot about a single centrally located post with the use of torsional hinges and a gimbal ring. Since these devices attract the lower surface of the mirrored platform toward the hot electrodes on the substrate, the precision and maximum tilt angle is limited by the size of the mirror.

Future MEMS mirror arrays for wavelength selective switching call for relatively long and stiff (thick) mirrors capable of tilting in two axes, and a relatively high tilt angle. Hidden hinge designs, in which the mirror is fabricated in a layer above the hinge plane, are attractive to reduce mirror mass moment of inertia and chip size, as the mirror need only be about the same size as the optically active area required.

Vertical comb drives provide relatively large electrostatic torque that is required for high tilt angle. Hidden hinges with vertical comb actuators are quite a powerful combination for next generation wavelength selective switches. It is also highly desirable to reduce complexity of vertical comb fabrication process.

An object of the present invention is to overcome the shortcomings of the prior art by providing a counterbalanced pivoting MEMS micro-mirror device in which the electrode surfaces are separate from the mirrored platform providing a large tilt angle, which is easily controllable and highly accurate. Another object of the present invention is to provide relatively long and thin micro-mirrors, which can be positioned very close together with only an air gap therebetween, by disposing both the roll and tilt electrodes along the same axis.

SUMMARY OF THE INVENTION

Accordingly, the present invention relates to A micro-electro-mechanical (MEMS) device comprising:
a substrate with first and second supports extending upwardly therefrom;
a tilting element pivotable about a first axis;
first hinges, defining the first axis, extending from opposite sides of the tilting element connected to the first and second supports;
a first ground electrode connected to the tilting element;
a pedestal extending upwardly from the tilting element;
a reflective body mounted on the pedestal;
a counter mass extending downwardly from the tilting element to counter balance the weight of the reflective body about the first axis; and
a first hot electrode mounted on the substrate for attracting the first ground electrode, thereby rotating the tilting element and the reflective body about the first axis.

Another aspect of the present invention relates to a micro-electro-mechanical (MEMs) device comprising:
a substrate with first and second supports extending upwardly therefrom;
a tilting element pivotable about a first axis;
first hinges, defining the first axis, extending from opposite sides of the tilting element connected to the first and second supports;
a first ground electrode connected to the tilting element;
a pedestal extending upwardly from the tilting element;
a reflective body mounted on the pedestal;
a counter mass extending downwardly from the tilting element to counter balance the weight of the reflective body about the first axis; and
a first hot electrode mounted on the substrate for attracting the first ground electrode, thereby rotating the tilting element and the reflective body about the first axis.

Another feature of the present invention relates to a method of manufacturing a MEMs device comprising:
a) forming a substrate (207) with a first hot electrode thereon and mounting posts extending therefrom;
b) forming a ground electrode layer (203) on a first handle wafer (253) including: a first ground electrode; and a counter mass;
c) forming a reflective body section (204) including a pedestal and a reflective body on a second handle wafer (251);
d) forming a hinge layer (202) on a third handle wafer (254) first hinges, defining the first axis extending laterally from opposite sides of the tilting element;
e) mounting the hinge layer (202) on the ground electrode layer (203);
f) removing the third handle wafer (254);

g) etching the hinge layer (202) to form a tilting element pivotable about a first axis; and first hinges, defining the first axis extending laterally from opposite sides of the tilting element;

h) mounting the pedestal of the reflective body section (204) onto the tilting element of the hinge layer (202);

i) removing the first wafer handle (253) from the ground electrode layer (203);

j) mounting the ground electrode layer (203) to the mounting posts suspending the first ground electrode above the first hot electrode; and g) removing the second handle wafer (251) of the reflective body section (204).

BRIEF DESCRIPTION OF THE DRAWINGS

The invention will be described in greater detail with reference to the accompanying drawings which represent preferred embodiments thereof, wherein:

FIG. 2b is a plan view of the electrode configuration of FIG. 2a;

FIGS. 3a to 3f illustrate the method of assembly of the MEMS device of the present invention;

FIGS. 11a to 11e illustrate side views of the micro-mirror of FIG. 7 in rest and active positions;

FIG. 12 is an isometric view of a biaxial MEMs counterbalanced micro mirror with electro-static comb drives;

DETAILED DESCRIPTION

Figure 1A:
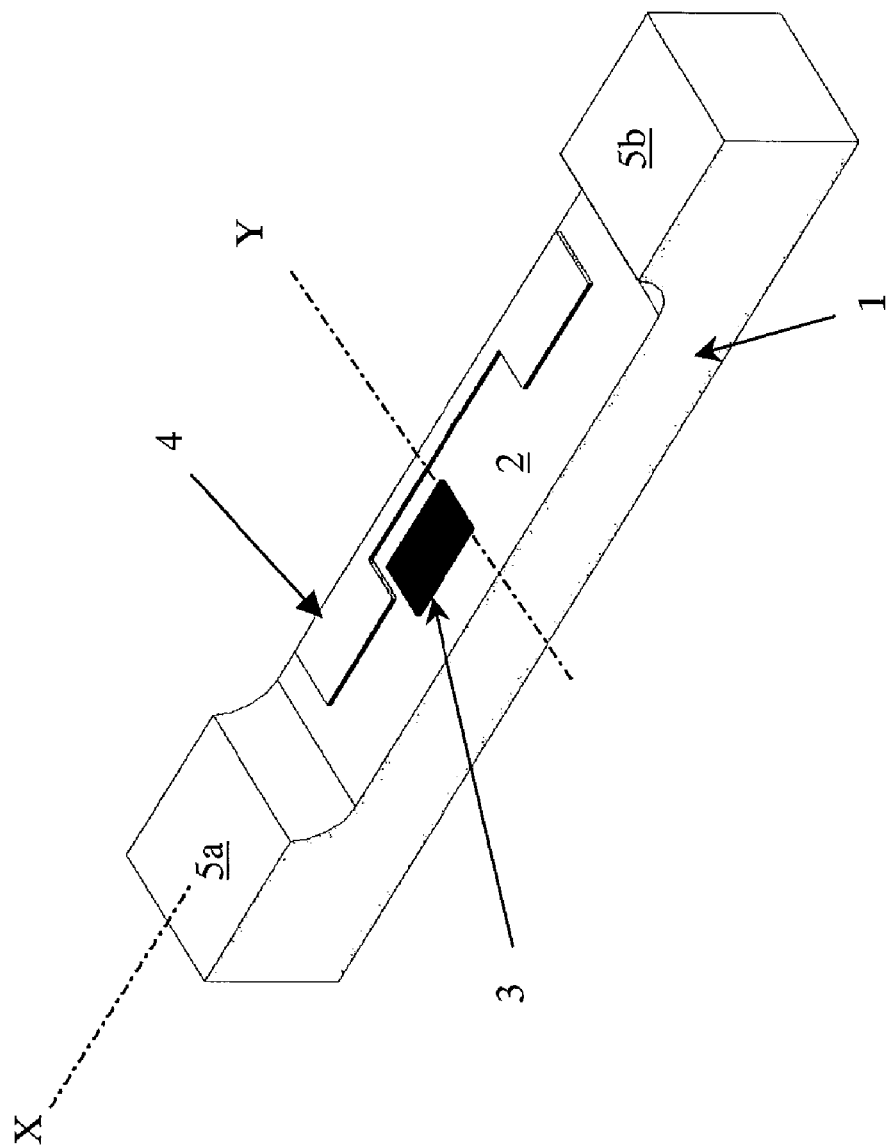
FIG. 1a is an isometric view of an electrode configuration of a first embodiment of the present invention.

With reference to FIG. 1a, the first embodiment of the device of the present invention includes a substrate wafer 1, e.g. glass or silicon, formed with a valley section 2 and raised supports 5a and 5b at opposite ends thereof. The substrate wafer 1 is patterned with a rectangular-shaped hot Y (or tilt) electro-static electrode 3, generally along and symmetrical about the longitudinal X-axis of the device and on one side of the lateral Y-axis of the device, and a C-shaped hot X (or roll) electro-static electrode 4 extending along one side of the valley section 2, i.e. on one side of the longitudinal X axis and on both sides of the lateral Y axis, symmetrical thereto. The roll electrode 4 includes two large sections, one on opposite sides of the y-axis, and a thin trace section extending therebetween, providing an area for the tilt electrode 3 to be located between the large sections of the roll electrode 4. Each of the large sections is arranged between the hot tilt electrode 3 and one of the raised end supports 5a or 5b, and connected through the middle by the elongated trace section, which is thinner than the large sections, and which extends beneath the side of the mirror adjacent to the roll electrode 4. Accordingly, the available space for the hot roll electrode 4 in the elongated mirror array is used efficiently and effectively, and achieves the required roll angle for a given voltage. Moreover, the structure of the hot roll and tilt electrodes 3 and 4 eliminates any undesired tilt induced by the actuation of the roll electrode 4. A second hot tilt electrode 3 can be provide on the opposite side of the Y-axis for increasing the control and the range of motion, but use of only a single hot tilt electrode 3 takes up less space, enabling just a single voltage source to actuate each mirror at the expense of limiting the angular range of motion. Positioning the first and second hot electrodes 3 and 4 along the X axis enables relatively long and thin mirror structures to be positioned relatively close together with only a small air gap therebetween.

Figure 1B:
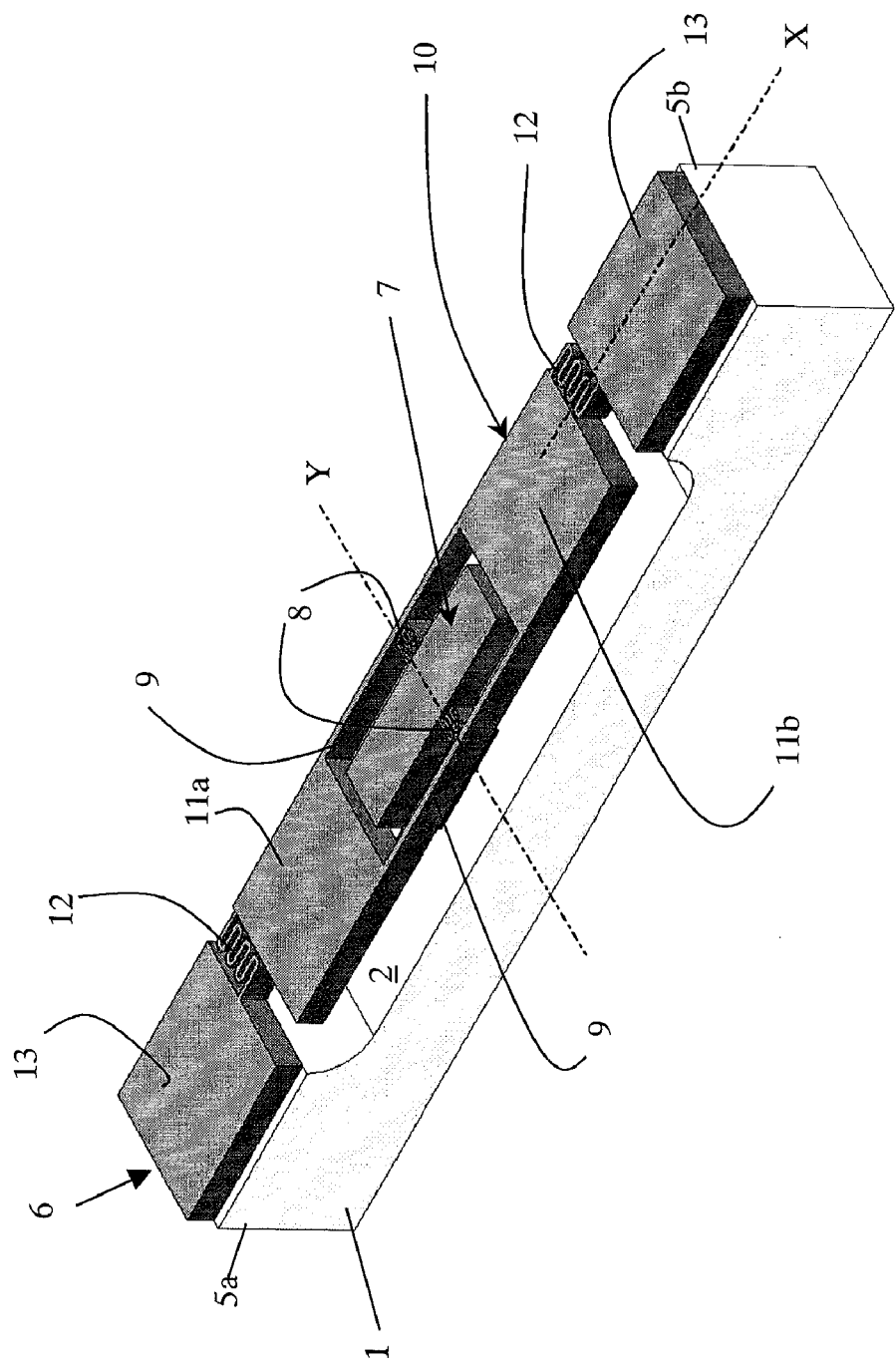
FIG. 1b is an isometric view of a hinge structure of the first embodiment of the present invention.

With reference to FIG. 1(b), a ground electrode/hinge wafer 6, processed independent of the substrate wafer 1, is bonded at each end thereof onto the supports 5a and 5b of the substrate wafer 1, suspending the remaining electrode/hinge structure above the valley section 2 of the substrate wafer 1. The electrode/hinge wafer 6 includes an inner, tilting, rectangular ground element or platform 7 pivotable about the lateral Y axis defined by laterally extending torsional tilt (piano) hinge 8. The tilt hinge 8 is ideally comprised of two serpentine beams, each with high aspect ratios, e.g. greater than ten, providing relatively low resistance to rotation about the Y-axis, but relatively higher resistance to rotation about the X-axis. The outer ends of the tilt hinge 8 are fixed to cross braces 9 proximate the lateral Y axis. The hot tilt electrode 3 is disposed below one side of the tilting ground platform 7, i.e. on one side of the Y-axis for attracting (or repelling) the bottom of one side of the tilting ground platform 7.

The cross braces 9 connect outer rolling structures 11a and 11b, e.g. frames or platforms, forming a rolling ground electrode element 10 with ground electrode surfaces for the hot roll electrode 4. Accordingly the hot roll electrode 4 is disposed below one side of both of the rolling structures 11a and 11b and below one of the cross braces 9, on the same side of the X-axis. As a result, the rolling ground electrode element 10 surrounds the tilting ground platform 7. A generally longitudinally extending torsional roll hinge 12 extends from the outer end of each of the rolling structures 11a and 11b to mounting platforms 13, which are mounted on the raised sections 5a and 5b of the substrate 1. The roll hinges 12 are ideally comprised of serpentine beams, each with high aspect ratios, e.g. greater than ten, providing relatively low resistance to rotation about the X-axis, but relatively higher resistance to rotation about the Y-axis. The tilting ground platform 7 is capable of tilting independently from the rolling ground electrode element 10 about the Y-axis, because the tilt hinges 8 extend from the rolling ground electrode element 10 and do no resist rotation about the Y-axis. The entire rolling ground electrode element 10 along with the tilting ground platform 7 tilt together about the X-axis via roll hinges 12, because the tilt hinges 8 resist rotation of the tilting ground platform 7 about the X-axis relative to the rolling ground electrode 10. The roll hinges 12 also acts as an electrical connection between ground electrodes 7, 11a and 11b and external bond pads (not shown).

Figure 1C:
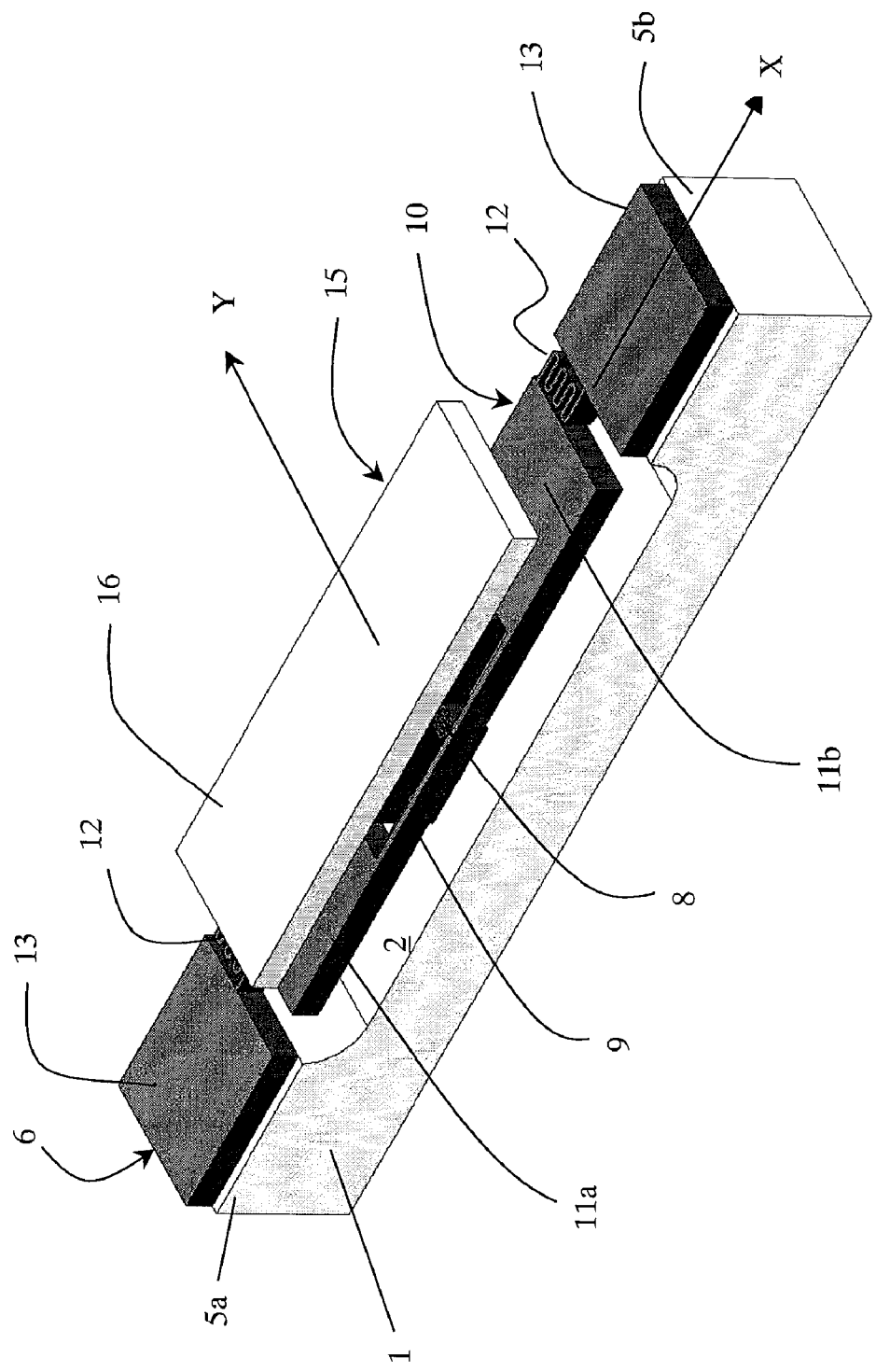
FIG. 1c is an isometric view of the MEMS device according to the first embodiment of the present invention.
Figure 1D:
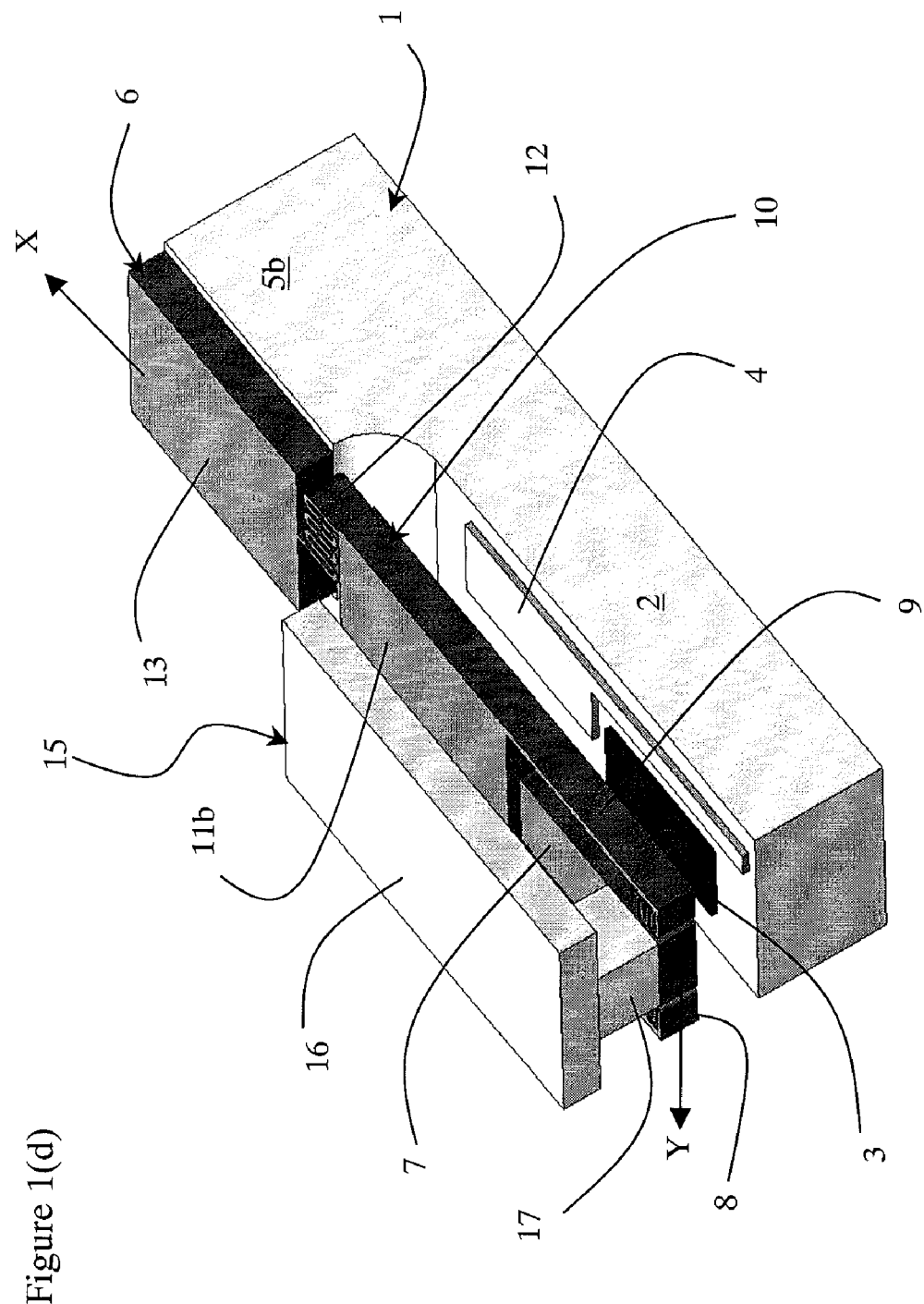
FIG. 1d is a cross-sectioned isometric view of the MEMS device of FIG. 1c.

With reference to FIGS. 1c and 1d, a mirror wafer 15 is patterned separately from the ground electrode/hinge wafer 6 and the substrate wafer 2 with an upper mirrored platform 16 and a pedestal 17 extending downwardly therefrom, which in turn is bonded onto the tilting ground platform 7. The mirror wafer 15 may have stiffening features such as ribs or bulkheads extending between the pedestal 17 and the mirror 16, if required. Ideally, a plurality of the MEMS devices are positioned adjacent each other with only a small air gap therebetween for redirecting individual sub-beams from a dispersed beam of light, as disclosed in U.S. Pat. No. 6,934,439 issued Aug. 23, 2005 in the name of Mala et al of JDS Uniphase Inc, which is incorporated herein by reference.

When a potential is applied to the hot tilt electrode 3 relative to ground, the electrostatic force of attraction between one side of the tilting ground platform 7 and the hot tilt electrode 3 causes the tilting ground platform 7 and the mirror wafer 15 to tilt, relative to the rolling ground electrode 10, about the Y-axis via tilt hinge 8. Similarly when a potential is applied to hot roll electrode 4 relative to ground, the electrostatic force of attraction between one side of the rolling ground electrode 10 and the hot roll electrode 4 causes the entire suspended portion of the ground layer 6, including the rolling ground electrode 10 and the tilting ground platform 7 along with the mirror wafer 15, to tilt about the outer roll hinges 12, i.e. the X axis. The angular position of the tilting ground platform 7 and accordingly the mirror 16 can be adjusted according to the amount of voltage applied to the tilt electrode 3 for redirecting a sub-beam of light incident on the mirror 16 to any one of a plurality of output ports, as is well known in the art of optical switching. To prevent the sub-beam from momentarily being transmitted to an output port physically in between the original output port and the new output port, the hot roll electrode 4 is activated to rotate the mirror 16 out of alignment with any of the output ports until the hot tilt electrode 3 is activated to tilt the mirror 16 to the correct angle corresponding with the desired output port. Then the hot roll electrode 4 is deactivated bringing the rolling ground electrode 10 back into the rest position with the tilting ground electrode 7 tilted at the correct angle corresponding to the desired output port. Suitable electrode configurations are disclosed in U.S. Pat. No. 6,968,101 issued Nov. 22, 2005, and U.S. Pat. No. 7,010,188 issued Mar. 7, 2006 both in the name of Miller et al to JDS Uniphase Inc, which are incorporated herein by reference.

With reference to FIGS. 2a to 2e, which illustrate a second embodiment of the present invention, the multi-layer design, according to the present invention, is alternatively implemented with vertical comb drives, instead of electro-static electrodes. The vertical comb drives provide relatively large electrostatic torque without suffering from pull-in instability phenomenon, enabling relatively high controllable angular range. Vertical comb drives are comprised of inter-digitized sets of rotor (moving) and stator (stationary) vertically extending fingers or teeth that are offset from each other in the vertical plane. Torque is generated due to vertical electrostatic force between rotor and stator combs when a potential difference is impressed upon them.

Conventionally the rotor and stator combs are tightly spaced, e.g. 4 um apart, therefore a relatively small lateral misalignment, e.g. >1 um, could result in an electrostatic force perpendicular to the fingers which may lead to lateral instability and collapse of the fingers. Accordingly, a precise lateral alignment, e.g. <1 um, is normally required for the fingers, which is challenging from a fabrication view point.

Moreover, in the case of high fill factor mirror arrays, there is an added consideration of in-plane mirror rotation about the tilt hinge and possible interaction with adjacent mirrors, as lateral spacing between mirrors is typically small, e.g. between 10 μm and 5 μm or less. There is also a wavelength shift associated with such lateral mirror rotation. For small finger spacing, e.g. 4 μm, this consideration calls for even tighter finger alignment, e.g. <0.25 μm, therefore a rather complex self-aligned mask fabrication process would be required. For example, a biaxial device would require a three level electrode design; an outer roll stator on the first substrate level with a corresponding rotor on a layer above, the inner tilt stator on this second level, and corresponding tilt rotor on a third level, adding considerable complexity in device fabrication and electrode addressing.

One possible solution to alleviate lateral interaction of fingers, and at the same time avoid complex self-align mask processes, is to increase the finger spacing, e.g. >10 μm, so that a relatively coarse misalignment, e.g. of 2 μm or less, is acceptable. However, it is highly desirable to eliminate any lateral rotation, as well as enable somewhat larger finger spacing, e.g. 6 um to 8 um, so that available torque is not compromised greatly.

An orthogonal comb actuator enables relatively coarse alignment of the fingers, and at the same time mostly eliminates lateral mirror rotation. In a vertical comb actuator in accordance with the present invention, comb fingers are fabricated in a plane that is perpendicular to the tilt plane of the mirror, therefore the lateral forces don't result in any significant rotation. The orthogonal comb actuator does cause in-plane linear movements; however, these are usually manageable as hinges are relatively strong for these modes of movements. The orthogonal comb actuator design provides: (a) a uni-axial tilt device with reduced in-plane rotation with relatively coarse alignment, and (b) a biaxial tilt device with a reduced in-plane rotation with relatively coarse alignment, as well as a simpler two level electrode design; i.e. outer roll and inner tilt stators are both on the same substrate level with corresponding rotors on the second level above.

Figure 2A:
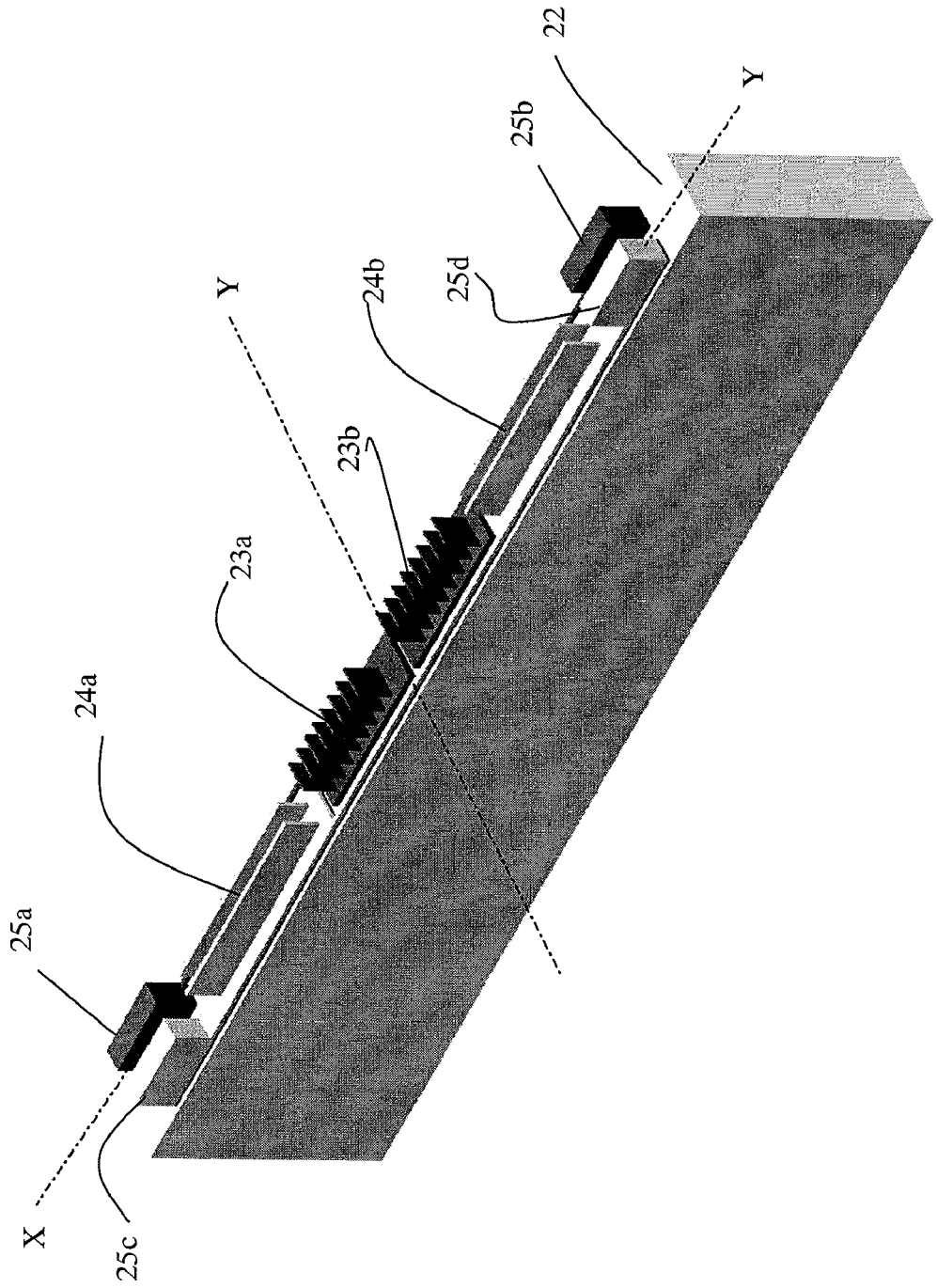
FIG. 2a is an isometric view of an electrode configuration of a second embodiment of the present invention.
Figure 2B:
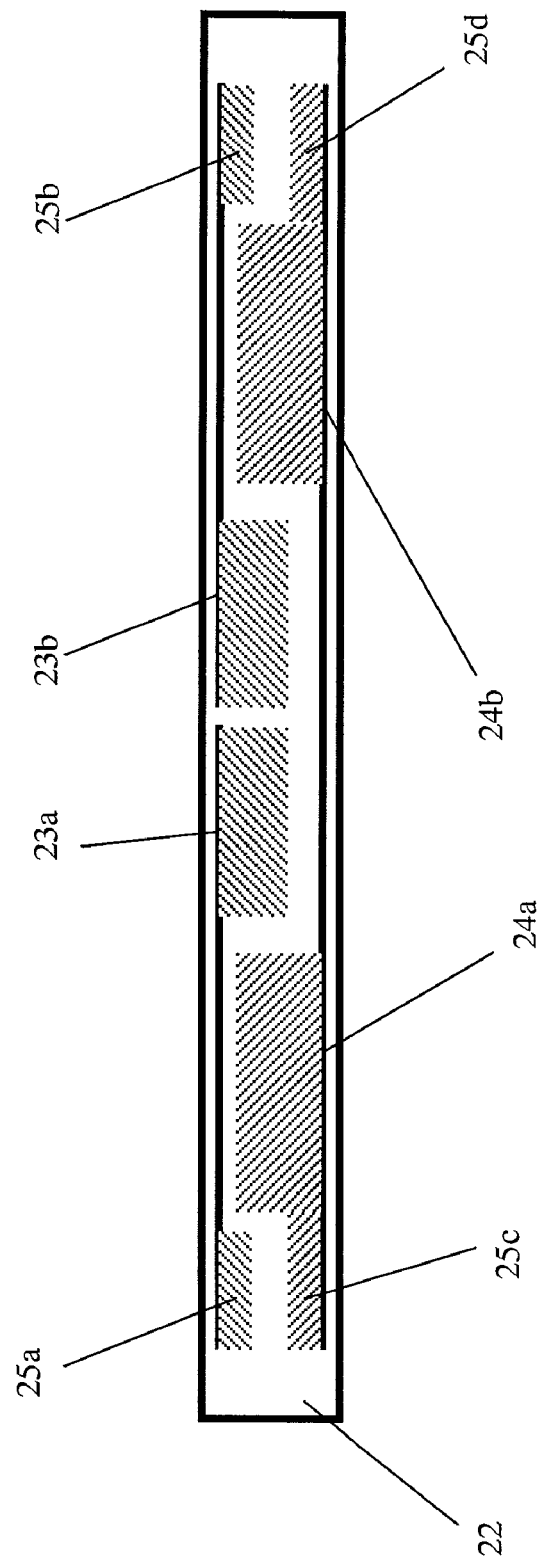

FIGS. 2a to 2e illustrate an implementation of a multi-layer hidden hinge device in accordance with the present invention along with an orthogonal vertical comb actuator. The first step is to pattern a multi-layer structure, e.g. a SOI structure, to form tilt (Y) and roll (X) stator comb electrodes 23a, 23b and 24a, 24b, respectively, which extend vertically upwardly from a substrate 22 (FIG. 2a). One or two tilt stator comb electrodes 23a and 23b can be provided depending on the desired control and range of motion. The first layer is patterned so as to individually address the tilt and roll comb electrodes 23a, 23b and 24a, 24b (FIG. 2b). One of the tilt stator comb electrodes 23a is connected to a first electrode contact 25a, while the other tilt stator comb electrode 23b is connected separately to a second electrode contact 25b. The roll stator comb electrodes 24a and 24b are connected to third and fourth electrode contacts 25c and 25d, respectively, and each other. The first and third electrode contacts 25a and 25c form a first raised support at one end of the substrate 22, while the second and fourth electrode contacts 25b and 25d form a second raised support at the opposite end of the substrate 22.

Preferably, the tilt stator comb electrodes 23a and 23b are disposed along the X axis, which corresponds to the longitudinal axis of the mirror 16, with each comb finger symmetrical to the X axis, i.e. the X-Z plane, and parallel to the Y axis, i.e. the Y-Z plane or the lateral axis of the mirror. The roll stator comb electrodes 24a and 24b are also disposed along the X axis, with the first roll stator comb electrodes 24a between the first tilt stator comb electrode 23a and the first and third electrode contacts 25a and 25c, and the second roll stator comb electrodes 24b between the second tilt stator comb electrode 23b and the second and fourth electrode contacts 25b and 25d. Each comb finger of the roll stator comb electrodes 24a and 24b is parallel to the X axis, i.e. the longitudinal axis of the mirror, and perpendicular to the Y axis, the lateral axis of the mirror.

A ground electrode/hinge wafer 26, processed separately from the vertical comb drive, is bonded at each end thereof onto the first and second raised supports of the substrate wafer 22 (FIG. 2c) suspending the remainder of the ground electrode/hinge wafer 26 above the tilt and roll stator comb electrodes 23a, 23b and 24a, 24b. The electrode/hinge wafer 26 includes an inner, tilting rotor ground element 27, comprised of first and second structures, e.g. frames, at opposite ends thereof forming tilt rotor comb electrodes 27a and 27b. The tilting rotor ground comb electrode 27 is pivotable about the lateral Y axis defined by laterally extending torsional ("piano") tilt hinges 28, the outer ends of which are fixed to longitudinal braces 29. The tilt hinges 28 are ideally comprised of two serpentine beams, each with high aspect ratio, e.g. greater than ten, providing relatively low resistance to rotation about the Y-axis, but relatively higher resistance to rotation about the X-axis. The tilt stator comb electrodes 23a and 23b are disposed below the tilt rotor comb electrodes 27a and 27b, respectively, i.e. on opposite sides of the tilt hinges 28 and the Y-axis. Each of the tilt rotor comb electrodes 27a and 27b includes laterally extending cross beams defining rotor comb fingers with slots therebetween offset and interdigitated with the stator comb fingers of the tilt stator comb electrodes 23a and 23b.

The longitudinally extending braces 29 connect outer roll rotor comb electrodes 31a and 31b forming a rolling rotor ground element 30 for the roll stator comb hot electrodes 24a and 24b, which are disposed below each of the roll rotor ground elements 31a and 31b, respectively. Each roll rotor comb electrode 31a and 31b includes longitudinally extending beams defining rotor comb fingers with slots therebetween offset from and interdigitated with the stator comb fingers of the roll stator comb electrodes 24a and 24b, respectively. A longitudinally extending torsional roll hinge 32 extends from each end of the rolling rotor comb ground element 30 to mounting platforms 33, which are mounted on the raised supports of the roll and tilt stator comb electrodes 23a, 23b and 24a, 24b, respectively. The roll hinges 32 are ideally comprised of serpentine beams, each with high aspect ratios, e.g. greater than 10, providing relatively low resistance to rotation about the X-axis, but relatively higher resistance to rotation about the Y-axis. The tilting rotor ground element 27 is capable of tilting independently of the rolling rotor ground element 30 about the Y-axis; however, the entire rolling rotor ground element 30 along with the tilting rotor ground element 27 tilt together about the X-axis via roll hinges 32. The roll hinges 32 also act as electrical connection between ground and external bond pads.

Figure 2C:
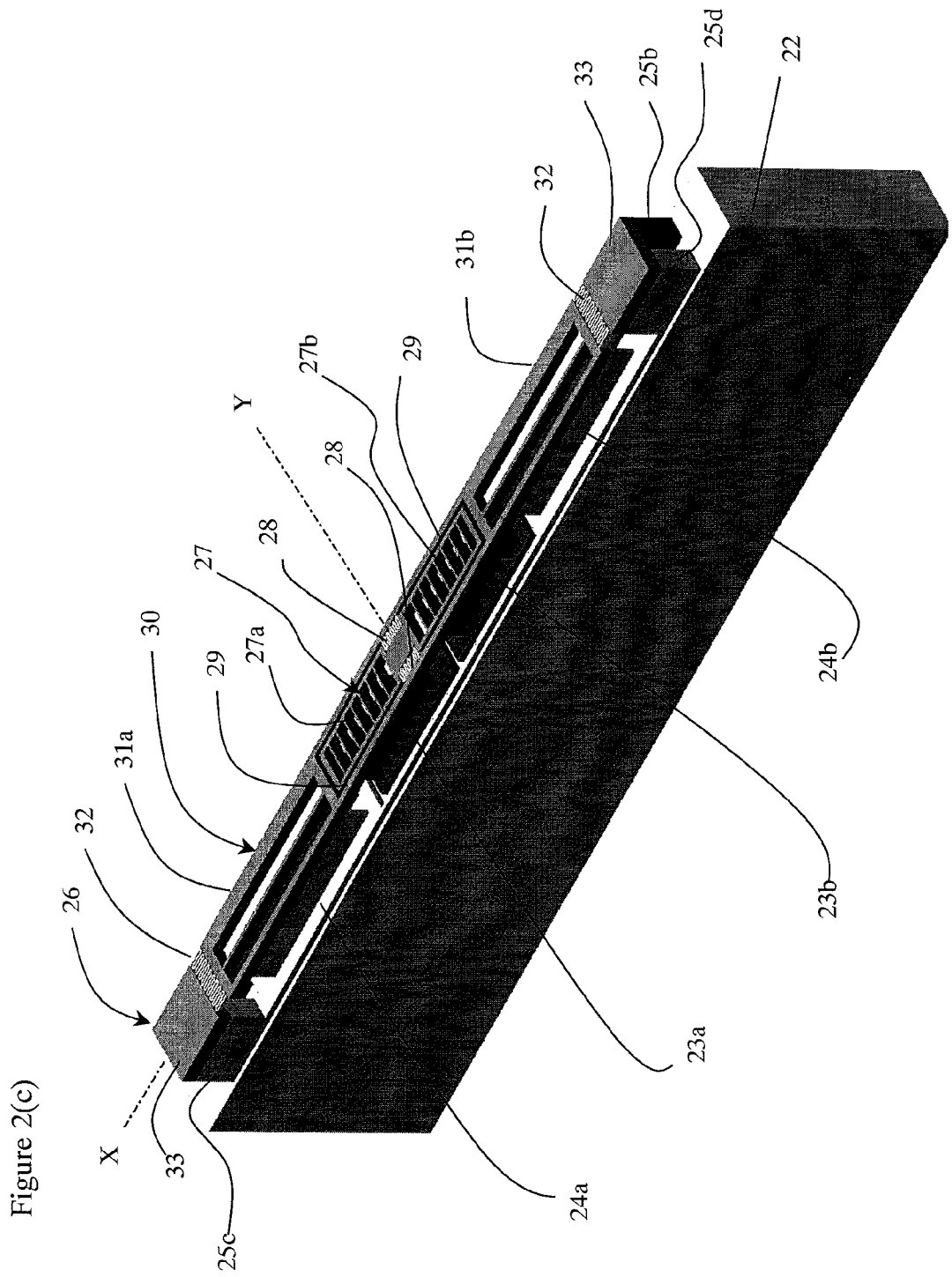
FIG. 2c is an isometric view of a hinge structure of the second embodiment of the present invention.
Figure 2D:
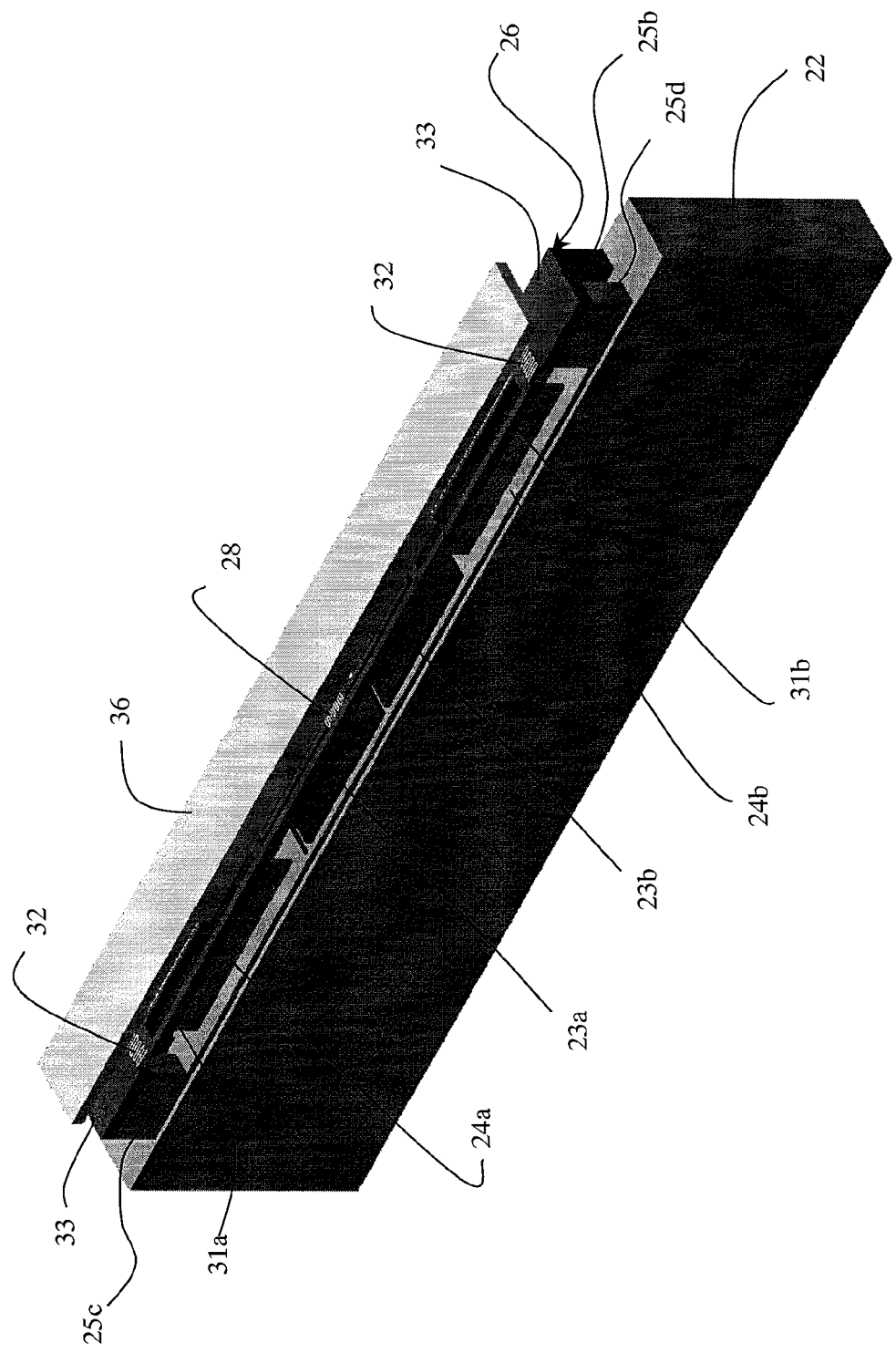
FIG. 2d is an isometric view of the MEMS device according to the second embodiment of the present invention.
Figure 2E:
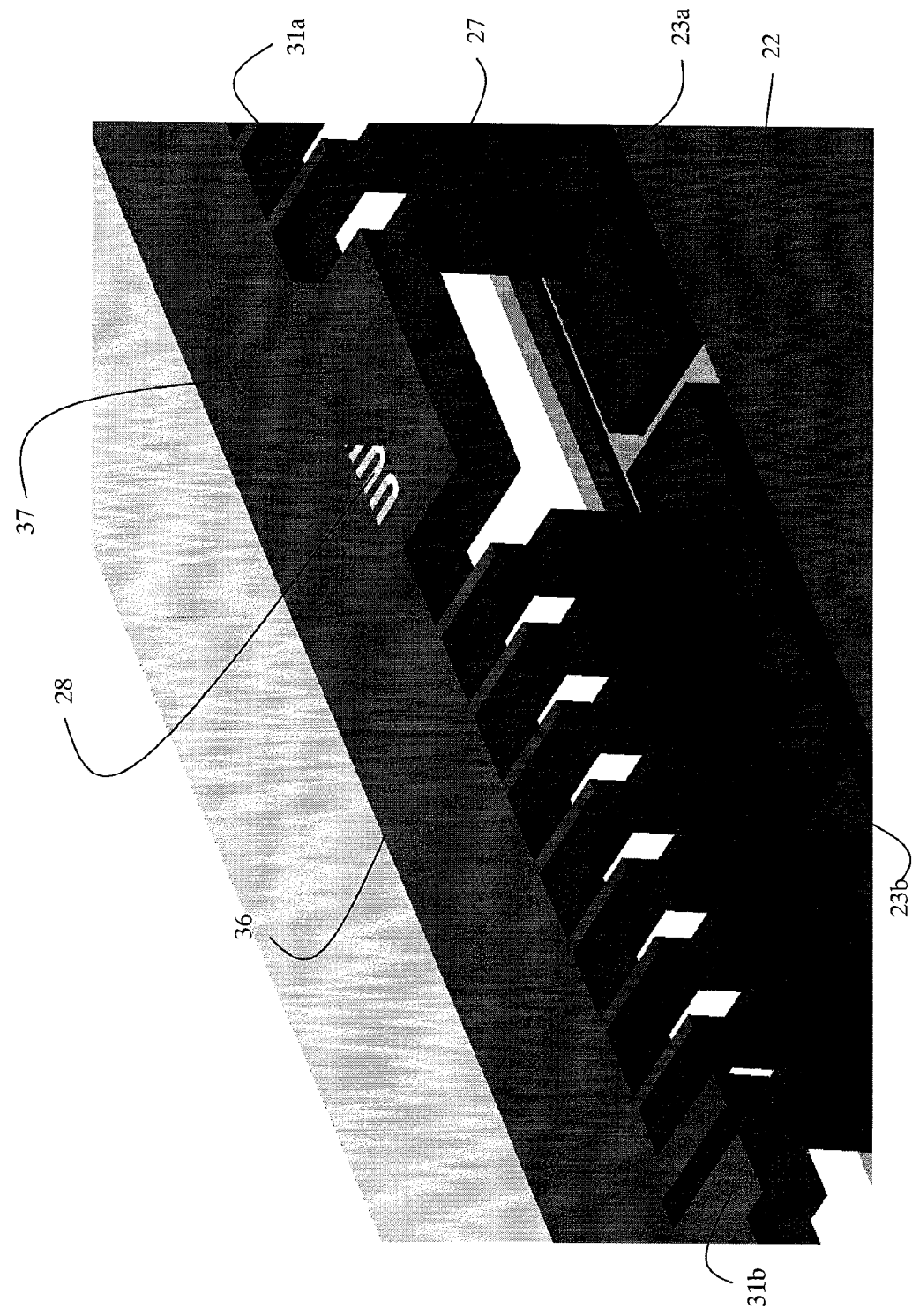
FIG. 2e is a cross-sectioned isometric view of the MEMS device of FIG. 2d.

A mirror wafer 36 is patterned separately with a pedestal 37, which is bonded onto the tilting rotor ground comb element 27 (FIGS. 2d and 2e). The mirror wafer 36 may have stiffening features such as ribs or bulkheads incorporated underneath. The upper surface of the mirror wafer 36 is typically coated with a highly reflective material.

When a potential is applied to one of the tilt stator comb electrodes 23a or 23b relative to ground layer 26, the electrostatic force of attraction between the tilt stator comb electrode 23a or 23b and the corresponding tilt rotor comb electrodes 27a and 27b of the tilting rotor ground comb electrode 27 causes the tilting rotor ground electrode 27 and the mirror 36, connected thereto, to tilt about the tilt hinges 28. Similarly when a potential is applied to the roll stator comb electrodes 24a and 24b relative to ground layer, the electrostatic force of attraction between the roll stator comb electrodes 24a and 24b and the roll rotor ground elements 31a and 31b, respectively, causes the mirror 36 and most of the ground layer 26, including the rolling rotor comb ground electrode 30 and the tilting rotor ground comb element 27 to tilt about the roll hinges 32.

A preliminary method of manufacturing the aforementioned MEMS devices is illustrated in FIGS. 3a to 3f, which utilizes three silicon-on-insulator (SOI) structures 41, 42 and 43 with two (fusion) bonding steps. Each SOI structure 41, 42 and 43 has multiple layers with silicon outer layers sandwiching the insulator ($SiO_2$) layer therebetween. Anodic bonding may also be used provided a pyrex glass layer is deposited prior to bonding.

In FIG. 3a the mirror wafer 36 (or 16) is processed, e.g. etched, with the pedestal 37 (or 17) from the top layer of silicon 51 in the first SOI structure 41. The initial etching process, to form the mirror/pedestal 16/17, does not extend down to the middle insulator layer 52, so that mounting arms 55 will remain to facilitate further assembly. The bottom layer of silicon provides a handle wafer 53 for stiffening and support during assembly.

In FIG. 3b, the hinge/ground wafer 26 (or 6) is processed in parallel with the mirror wafer 36, in which tilt and roll hinges 28 and 32 (or 8 and 12), respectively, and the tilt and roll rotor comb ground elements 27 and 30 (or 7 and 11), respectively, are patterned, e.g. etched, from the top silicon layer 61 down to the insulator layer 62 of the second SOI structure 42. The remaining silicon layer provides a handle wafer 63 for structural support during assembly.

In FIG. 3c, the top layer 71 of the third SOI structure 43 can also be processed, e.g. etched down to the insulator layer 72, in parallel to the aforementioned first and second SIO structures 41 and 42, to define the tilt and roll stator comb electrodes 23a, 23b and 24a, 24b with electrode traces and electrode contacts 25a to 25d. For the first embodiment, the third SOI structure 43 can be replaced by a single layer of silicon, which has the tilt and roll electro-static electrodes 3 and 4 patterned thereon. The bottom silicon layer 73 provides a handle wafer for further processing, and becomes the substrate 22, as hereinbefore described.

With reference to FIG. 3d, the first SOI structure 41 patterned with the mirror 36 and the second SIO structure 42 patterned with the hinge/ground wafer 26 (or 6) are fusion bonded together, whereby the pedestal 37 (or 17) is fixed to the center of the tilt ground element 27 (or 7). For alignment purposes, the mounting arms 55 are also connected to the mounting platforms 33 (or 13). The bonding alignment is relatively coarse.

After removing the handle wafer 63, e.g. by etching away the bottom and insulator layers 63 and 62, respectively, of the second SOI structure 42, the hinge/ground wafer 26 with the mirror 36 bonded thereto is bonded to the third SOI structure 43, i.e. the mounting platforms 33 are mounted on the raised electrode contacts 25a to 25d. Alternatively, the hinge/ground wafer 6 with the mirror 16 is bonded to raised supports 5a and 5b on the silicon substrate 1. The bonding alignment is relatively coarse.

Finally, the mirror handle wafer 53 is removed, and reflective metal is deposited on the mirror 36, followed by a release, e.g. deep reactive ion etching (DRIE), of the mirror 36 by removal of the mounting arms 55. The hinge layer 26 (or 6) provides tilt about two axes and is attached at its ends to supports 25a to 25d (or 5a and 5b) projecting from the substrate layer 22 (or 1). The advantages of the design of the present invention are that the hinge actuators 27, 30 for the micro-mirror are hidden below the mirror 36, thereby permitting a high fill factor, and that a large deflection can be obtained from the micro-mirror 36 mounted on the pedestal 37.

Furthermore, the preferred embodiment of the micro-mirror device of the present invention utilizes orthogonal vertical comb actuators to provide rotation about two axes. A first comb actuator, comprised of the tilt stators 23a and 23b and the tilt rotors 27, which provides tilt about a first axis, e.g. Y-axis, has teeth planes which are parallel to the Y-Z plane. A second comb actuator, comprised of the roll stators 24a and 24b and the roll rotors 31a and 31b, which provides roll about X-axis, has actuator comb teeth planes that are parallel to X-Z plane. The orthogonal orientation of the two comb actuators has the advantage that rotation about the Z-axis is suppressed. This advantage is important in fabricating a piano micro-mirror array in which the micro-mirrors are closely spaced (high fill factor) with only an air gap between mirrors 36. Another feature of the comb actuators is that the teeth spacing is coarse (greater than 10 micron) thereby easing the alignment between the teeth on the rotor comb with respect to the teeth on the stator comb. This advantage eases the fabrication of the comb actuator by bonding together two layers in which one layer has the rotor comb and the other layer has the stator comb.

Due to the offset of the center of mass of the mirror wafer 15 from the hinge axis Y, there can be a mass imbalance in the vertical or Z-direction, which may result in the mirror wafer 15 suffering from an undesired tilt about the Y-axis when subjected to a force along the X-axis. Such a force may be a result of external disturbances such as shock and vibration, causing a penalty in device attenuation accuracy.

Figure 4:
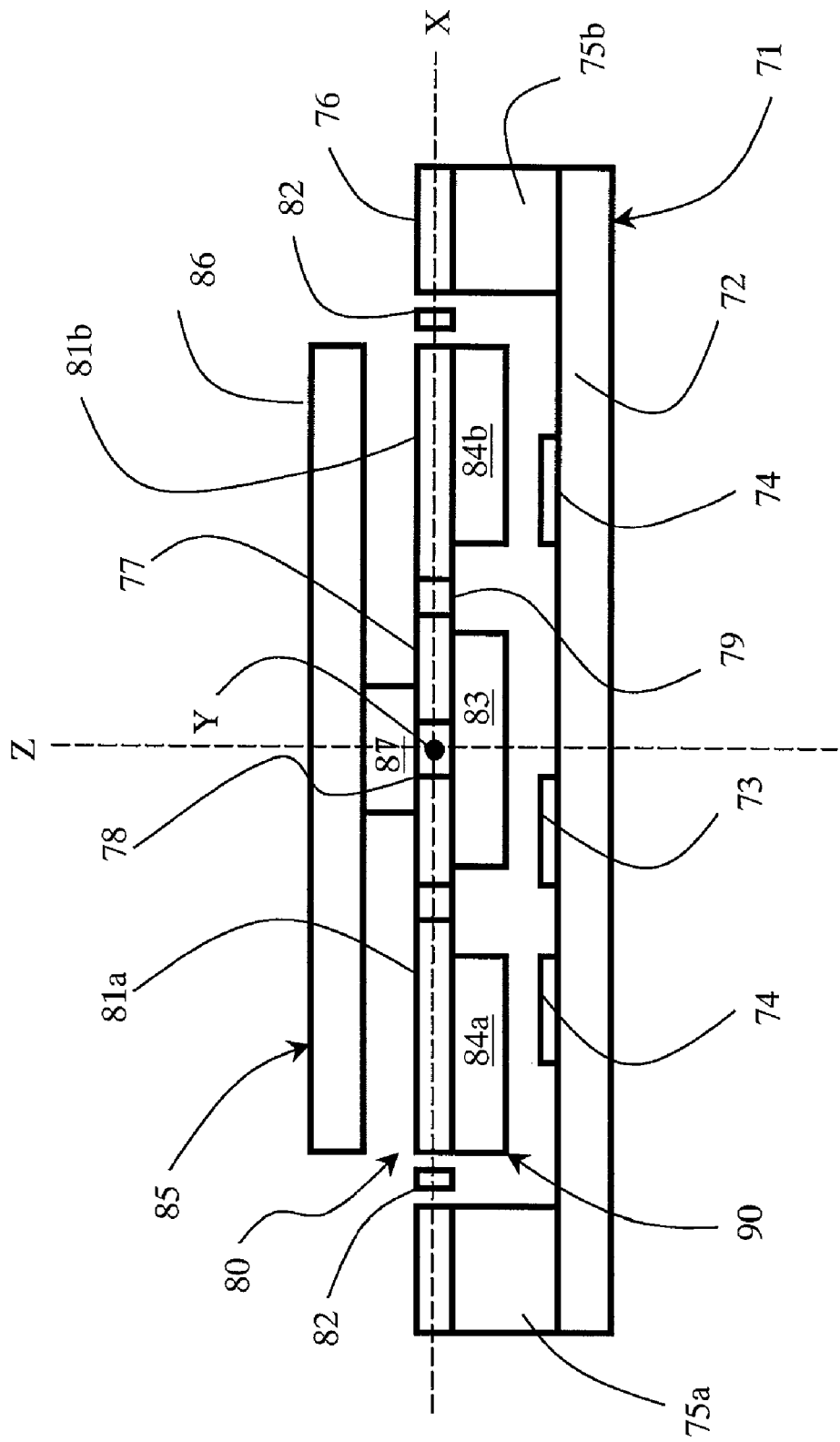
FIG. 4 illustrates an alternate embodiment of the present invention in which the ground electrodes counterbalance the mirror wafer.

An alternate embodiment of the present invention provides a solution to the aforementioned problem by having separate hinge and ground electrode layers, with the ground electrode layer below the hinge layer counter balancing the weight of the mirror above the hinge plane. With reference to FIG. 4, the counter balanced embodiment of the device of the present invention includes a substrate wafer 71, e.g. glass or silicon, formed with a valley section 72 and raised supports 75a and 75b at opposite ends thereof. The substrate wafer 71 is patterned with a rectangular-shaped Y (or tilt) electro-static hot (stator) electrode 73, generally along and symmetrical about the longitudinal X-axis of the device and on one side of the lateral Y-axis of the device, and a C-shaped X (or roll) electro-static hot (stator) electrode 74 extending along one side of the valley section 72, i.e. on one side of the longitudinal X axis and on both sides of the lateral Y axis, symmetrical thereto. The roll electrode 74 includes two large sections, each one on opposite sides of the Y-axis, and a thin trace section extending therebetween, providing an area for the tilt electrode 73 to be located between the large sections of the roll electrode 74. Each of the large sections is arranged between the tilt electrode 73 and one of the raised end supports 75a or 75b, and connected through the middle by the elongated trace section, which is thinner than the large sections, and which extends beneath the side of the mirror adjacent to the roll electrode 74. Accordingly, the available space for the roll electrode 74 in the elongated mirror array is used efficiently and effectively, and achieves the required roll angle for a given voltage. Moreover, the structure of the roll and tilt electrodes 73 and 74 eliminates any undesired tilt induced by the actuation of the roll electrode 74. A second tilt electrode 73 can be provide on the opposite side of the Y-axis for increasing the control and the range of motion, but use of only a single roll electrode 73 takes up less space, and reduces the amount of electrical connections required at the expense of a reduction in the angular range of motion. Positioning the roll and tilt electrodes along the X axis enables relatively long and thin mirror structures to be positioned relatively close together with only a small air gap therebetween.

A hinge wafer 76 is processed independent of a ground electrode wafer 90. The hinge wafer 76 is bonded at each end thereof onto the supports 75a and 75b of the substrate wafer 71, suspending the remaining electrode/hinge structure above the valley section 72 of the substrate wafer 71. The hinge wafer 76 includes an inner, tilting element or platform 77 pivotable about the lateral Y axis defined by laterally extending torsional tilt (piano) hinge 78. The tilt hinge 78 is ideally comprised of two serpentine beams, each with high aspect ratios, e.g. greater than ten, providing relatively low resistance to rotation about the Y-axis, but relatively higher resistance to rotation about the X-axis. The outer ends of the tilt hinge 78 are fixed to cross braces 79, similar to cross braces 29 in FIG. 2c, proximate the lateral Y axis.

The cross braces 79 connect first and second outer rolling structures 81a and 81b, e.g. frames or platforms (similar to outer rolling structures 11a and 11b above), forming a rolling element 80. As a result, the rolling element 80 surrounds the tilting platform 77. A generally longitudinally extending torsional roll hinge 82 extends from the outer end of each of the rolling structures 81a and 81b to mounting platforms mounted on the raised supports 75a and 75b of the substrate 71. The roll hinges 82 are ideally comprised of serpentine beams, each with high aspect ratios, e.g. greater than ten, providing relatively low resistance to rotation about the X-axis, but relatively higher resistance to rotation about the Y-axis. The tilting platform 77 is capable of tilting independently from the rolling element 80 about the Y-axis, because the tilt hinges 78 extend from the rolling element 80 and do no resist rotation about the Y-axis. The entire rolling element 80 along with the tilting platform 77 tilt together about the X-axis via roll hinges 82, because the tilt hinges 78 resist rotation of the tilting platform 77 about the X-axis relative to the rolling element 80. The roll hinges 82 also acts as an electrical connection between ground and external bond pads.

The ground layer 90 is comprised of a tilting ground (rotor) electrode 83 mounted underneath the tilting platform 77, and first and second roll ground (rotor) electrodes 84a and 84b mounted underneath the first and second outer rolling structures 81a and 81b, respectively. The hot tilt electrode 73 is disposed below one side of the tilt ground electrode 83, i.e. on one side of the Y-axis for attracting (or repelling) the bottom of one side of the tilt ground electrode 83, resulting in the tilting of the tilting platform 77. The first roll ground electrode 84a is disposed above one of the large sections of the hot roll electrode 74, while the second roll ground electrode 84b is disposed above the other one of the large sections of hot roll electrode 74.

A mirror wafer 85 is patterned separately from the hinge wafer 76, the ground electrode wafer 90, and the substrate wafer 72, with an upper mirrored platform 86 and pedestal 87 extending downwardly therefrom, which in turn is bonded onto the tilting platform 77. The mirror wafer 85 may have stiffening features such as ribs or bulkheads extending between the pedestal 87 and the upper mirrored platform 86, if required. Ideally, a plurality of the MEMS devices are positioned adjacent each other with only a small air gap therebetween for redirecting individual sub-beams from a dispersed beam of light, as disclosed in U.S. Pat. No. 6,934,439 issued Aug. 23, 2005 in the name of Mala et al of JDS Uniphase Inc, which is incorporated herein by reference.

When a potential is applied to the hot tilt electrode 73 relative to ground, the electrostatic force of attraction between one side of the tilt ground electrode 83 and the hot tilt electrode 73 causes the tilt ground electrode 83, the tilting platform 77, and the mirror wafer 85 to tilt, relative to the rolling element 80, about the Y-axis via the tilt hinge 78. Similarly when a potential is applied to the hot roll electrode 74 relative to ground, the electrostatic force of attraction between one side of the roll ground electrodes 84a and 84b and the hot roll electrode 74 causes the entire suspended portion of the hinge layer 76 and ground layer 75, including the rolling element 80 and the tilting platform 77 along with the mirror wafer 85, to tilt about the outer roll hinges 82, i.e. the X axis. The angular position of the tilting platform 77, and accordingly the mirror 86, can be adjusted according to the amount of voltage applied to the hot tilt electrode 73 for redirecting a sub-beam of light incident on the mirror platform 86 to any one of a plurality of output ports, as is well known in the art of optical switching. To prevent the sub-beam from momentarily being transmitted to an output port physically in between the original output port and the new output port, the hot roll electrode 74 is activated to rotate the mirrored platform 86 about the X-axis and out of alignment with any of the output ports until the hot tilt electrode 73 is activated to tilt the mirrored platform 86 to the correct angle corresponding with the desired output port. Then the hot roll electrode 74 is deactivated bringing the rolling element 80 back into the rest position with the tilting platform 77 tilted at the correct angle corresponding to the desired output port. Suitable electrode configurations are disclosed in U.S. Pat. No. 6,968,101 issued Nov. 22, 2005, and U.S. Pat. No. 7,010,188 issued Mar. 7, 2006 both in the name of Miller et al to JDS Uniphase Inc, which are incorporated herein by reference.

The thickness of the ground wafer layer 90, i.e. tilt and roll ground electrodes 83, 84a and 84b, may be chosen to precisely counter balance the torque generated by the mirror 85 about the Y-axis due to external disturbance along the X-axis. Additional bulk heads may also be provided in the ground layer 90 to ensure the correct weight distribution, when the weight and position of the tilt and roll ground electrodes 83, 84a and 84b are not sufficient. Accordingly, it is possible to have the center of mass of the mirror/hinge/ground electrode structure along the Z-axis coincident with the hinge (Y) axis, therefore superior mirror stability under external disturbances such as shock and vibration.

The hot tilt and roll electrodes 73 and 74, and the ground tilt and roll electrodes 83, 84a and 84b can be planar or plate electrodes or they can be comb drive electrodes, as illustrated in FIGS. 2c to 2d and as hereinbefore described.

Figure 5A:
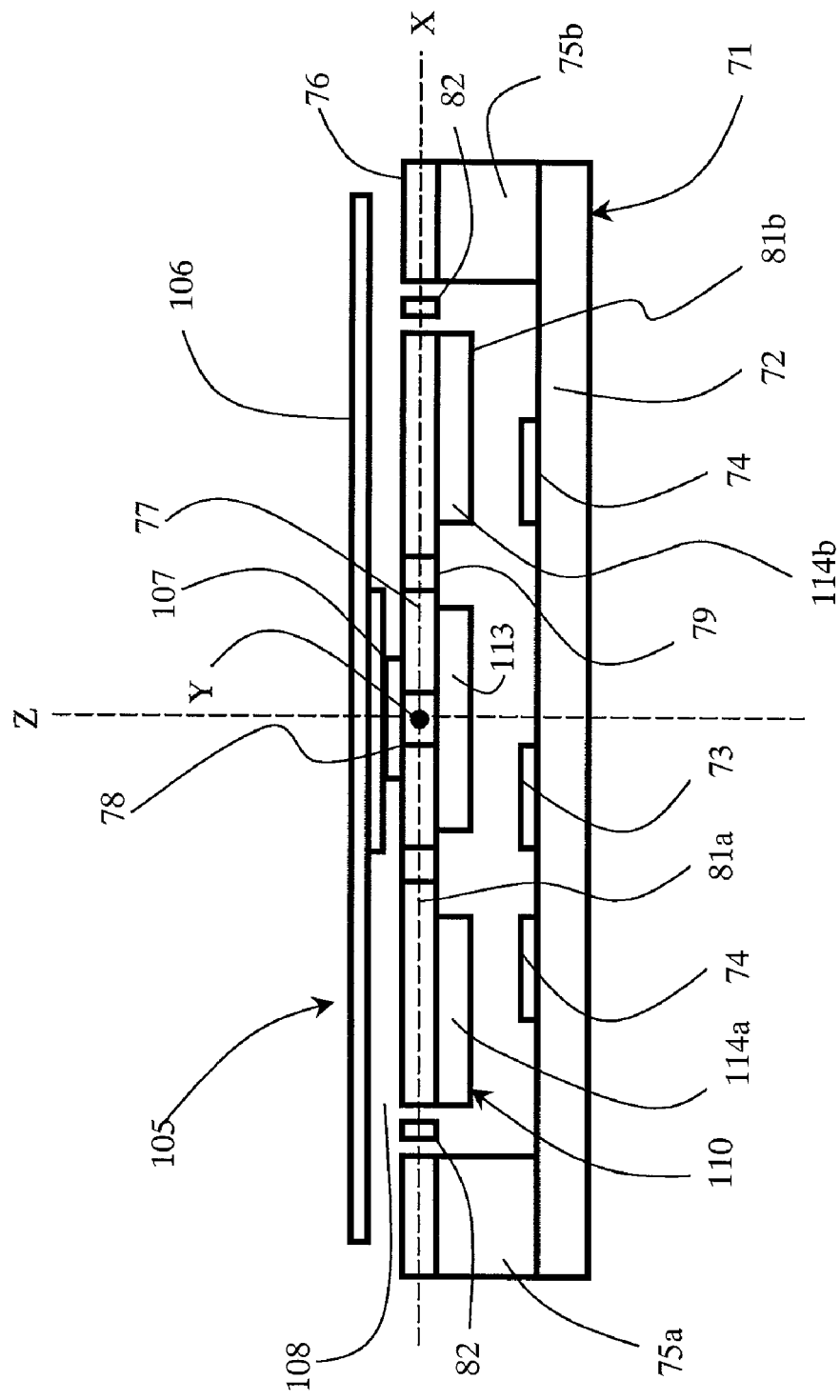
FIGS. 5a, 5b, 6a and 6b illustrate thinner two-step mirror wafers counter-balanced by the ground electrodes.
Figure 5B:
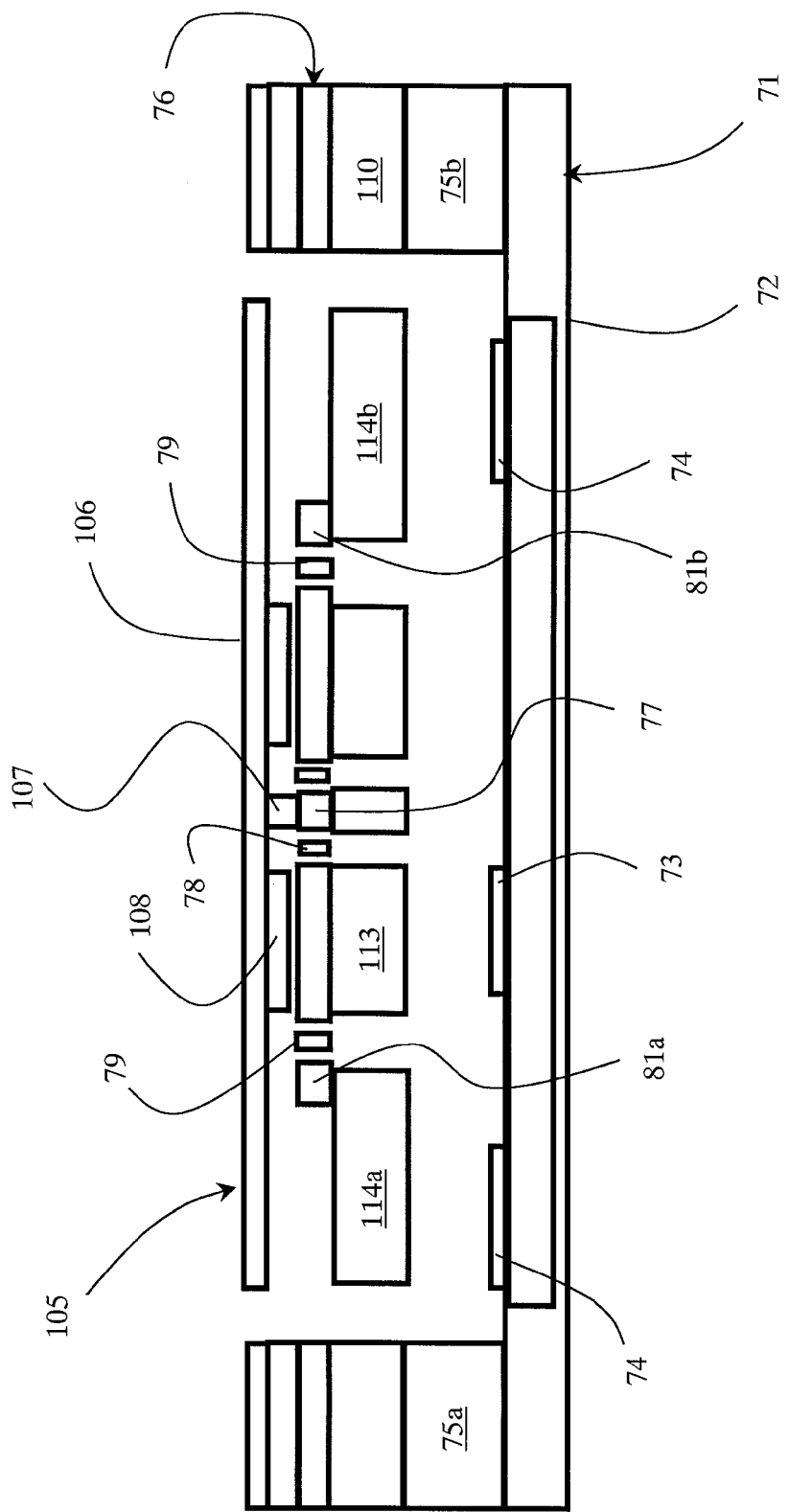

Another variation of the present invention, is illustrated in FIGS. 5a and 5b, in which a two-step mirror structure 105, including a reflective upper section 106, a pedestal 107 and a support structure 108 therebetween, replaces the mirror structure 85, and is moved closer to the hinge (Y) axis by using a shorter pedestal 107. In FIG. 5b, the mirror 105 is decoupled from the tilting platform 77 except for the pedestal 107, whereby strengthening ribs in the support structure 108 extend down from the bottom of the mirror 105 short of the hinge layer 76 and separate from the pedestal 107. A shallow mirror etch would be required to make the strengthening ribs in the support structure 108 shorter than the pedestal 107, which are all formed by one or more bottom side mirror etch steps. Accordingly, the torque about the Y-axis caused by the mirror structure 105 is less than the previous mirror structure 85, whereby less counter mass is required to balance the forces around the Y-axis, resulting in a thinner ground layer 110, i.e. thinner roll ground electrodes 114a and 114b and thinner tilt ground electrode 113. The step between the upper section 106 and the support structure 108 provides necessary swing space between the upper section 106 and the stationary ends of the hinge layer 76 when a biaxial tilt mirror array is desired. Additional swing space can be provided for the mirror 105 by an etch of the hinge layer 76 beneath the ends of the mirror 106, thereby removing most of the first and second outer rolling structures 81a and 81b, respectively, as in FIG. 5b. To support the reduced hinge layer 76, additional posts, which are not shown in FIG. 5b, but can be seen in FIGS. 12 to 16, are provided extending up from the substrate 71 between the hot roll electrodes 74 and the hot tilt electrode 73 for attachment to the end of the roll hinge 79. The mirror standoff between the bottom of mirror 106 and the hinge layer 76 in this case is relatively shallow, e.g. 2 µm.

The thickness of the ground wafer layer 100, i.e. tilt and roll ground electrodes 113, 114a and 114b, may be chosen to precisely counter balance the torque generated by the mirror 105 about the Y-axis due to external disturbance along the X-axis. Additional bulk heads may also be provided in the ground layer 110 to ensure the correct weight distribution, when the weight and position of the tilt and roll ground electrodes 113, 114a and 114b are not sufficient. Accordingly, it is possible to have the center of mass of the mirror/hinge/ground electrode structure along the Z-axis coincident with the hinge (Y) axis, therefore superior mirror stability under external disturbances such as shock and vibration.

The hot tilt and roll electrodes 73 and 74, and the ground tilt and roll electrodes 113, 114a and 114b can be planar or plate electrodes or they can be comb drive electrodes, as illustrated in FIGS. 2c to 2d and as hereinbefore described.

Figure 6A:
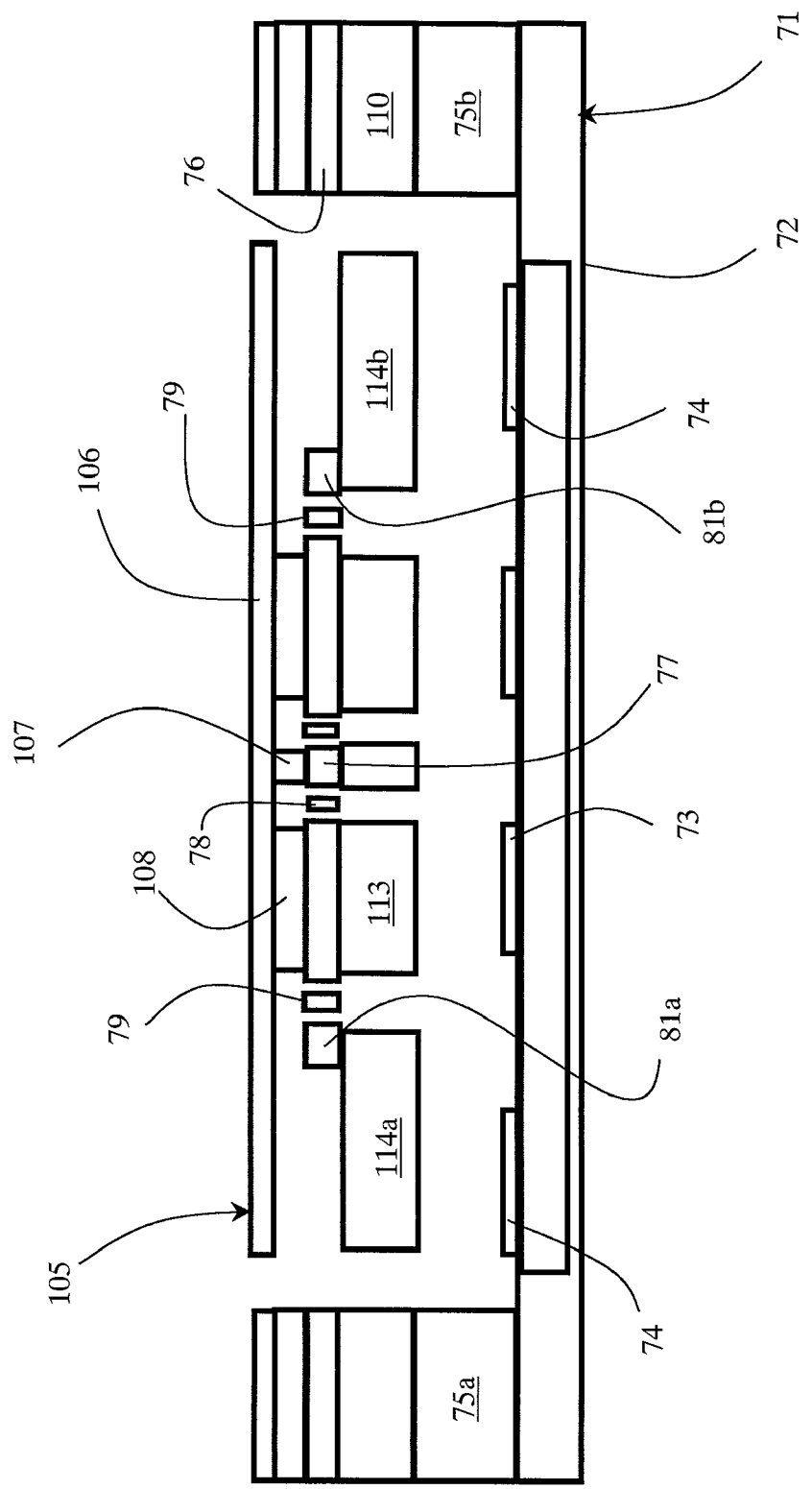
Figure 6B:
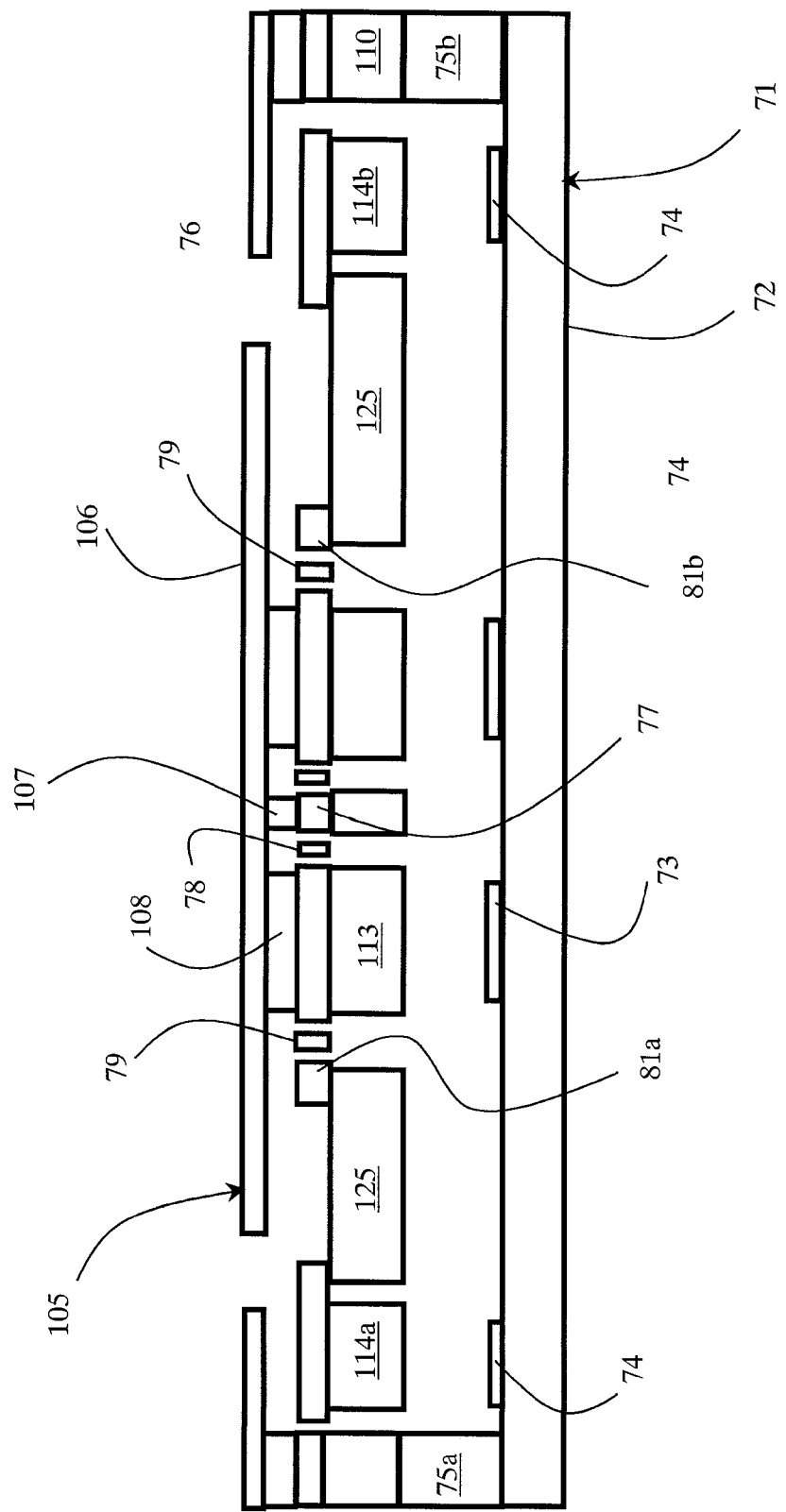

Yet another variation of the design is shown in FIGS. 6a and 6b, in which the single step mirror 105 is integrated with the tilting platform 77 of the ground layer 76 via the strengthening ribs in the support structure 108, which are fixed to the tilting platform 77. The pedestal 107 and the strengthening ribs in the support structure 108 are separately defined in a back side etch step of the mirror 105. The advantage is that the stiffness of the mirror 105 is increased substantially, although any change in mirror curvature will now be felt by the electrode layer 76. In the embodiment of FIG. 6b, the roll ground electrodes 114a and 114b are disposed outside the footprint of the mirror 105, fixed to a portion of the hinge layer 76, which extends via a connecting bridge 125 in the ground layer 110.

Figure 7:
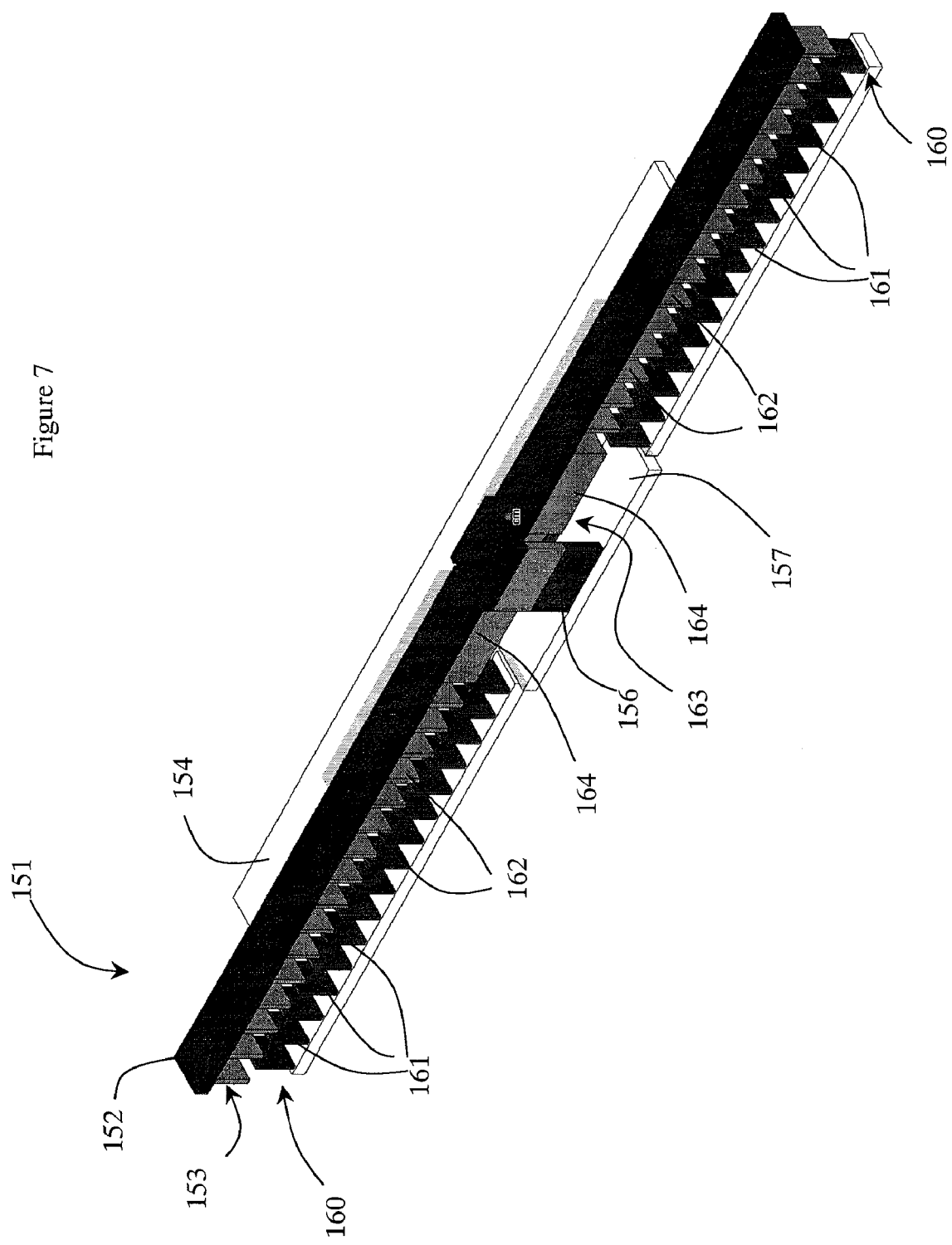
FIG. 7 is an isometric view of a 1-D MEMs counterbalanced micro mirror with electro-static comb drives.
Figure 8:
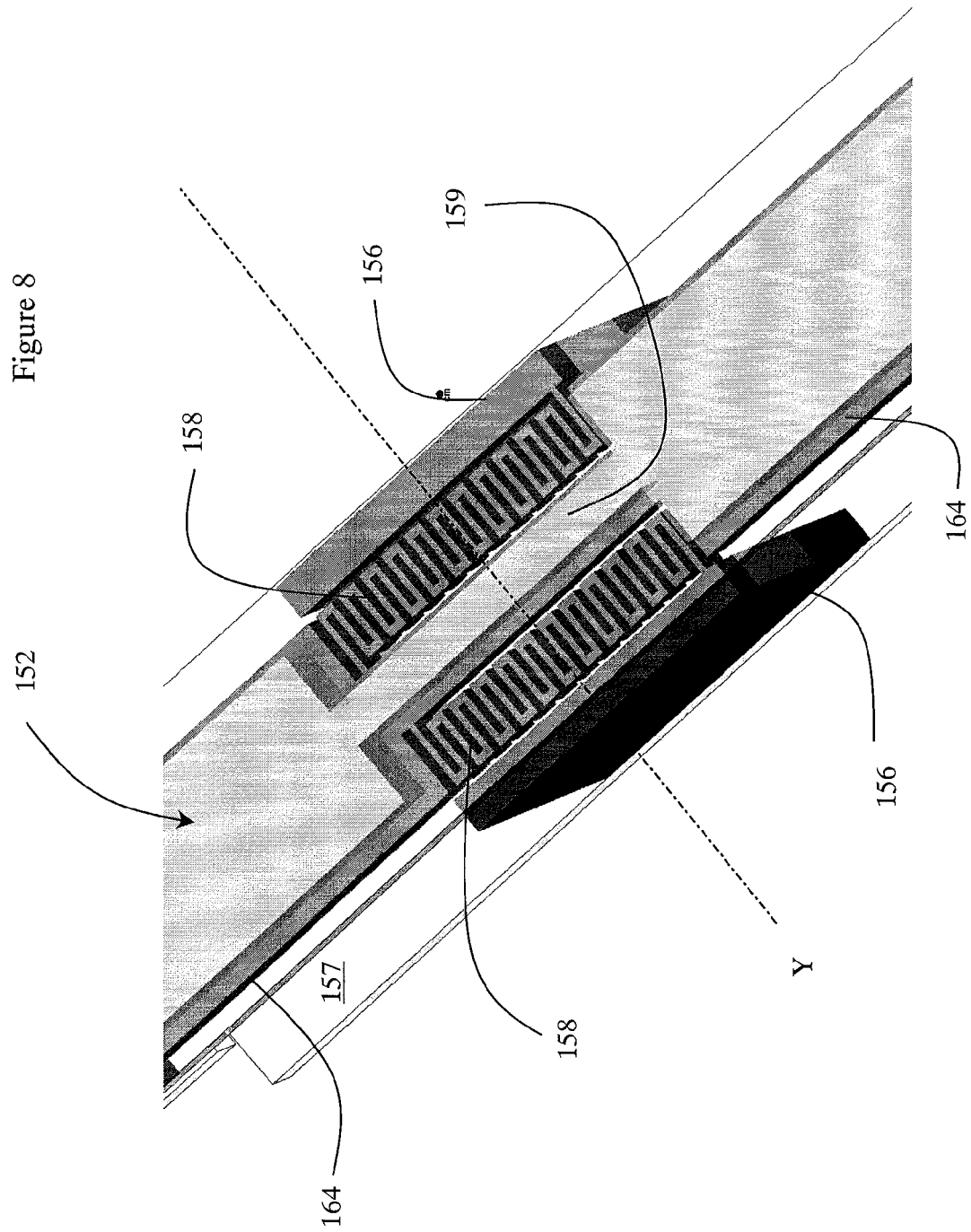
FIG. 8 is a top view of the hinge structure of the micromirror of FIG. 7.

FIG. 7 provides an isometric and cross-sectional view of a uniaxial-tilt, hidden-hinge micro mirror 151 with a hinge layer 152 separate from a rotor electrode layer 153, which are both separate from a mirror layer 154. The mirror layer 154 is raised above the hinge layer 152 via pedestals 155. The micro mirror 151 is pivotally connected to fixed posts 156, which extend upwardly from a substrate 157, via torsional hinges 158, preferably serpentine torsional hinges, as hereinbefore described. The hinges 158, illustrated in FIG. 8, are formed in the hinge layer 152, and extend between the fixed posts 156 and a narrow section 159 of the hinge layer 153 defining a tilt (Y) axis of the micro mirror 151. The torsional hinges 158 and the narrow section 159 are substantially the same width as the remainder of the hinge layer 152 and the rotor electrode and mirror layers 153 and 154, respectively, whereby several micro mirrors 151 can be positioned side by side with only a small air gap therebetween. As above, the size and shape of the hinge layer 152 is separate (decoupled) from the size and shape of the rotor electrode layer 153 and the mirror layer 154.

An electro-static drive is provided to rotate the micro mirror 151, in the form of a hot or stator electrode 160 mounted on the substrate 157 for attracting the rotor (or ground) electrode layer 153. The illustrated embodiment includes a hot stator electrode 160 below each side of the hinge layer 152, i.e. below each side of the mirror layer 154; however, an embodiment with just one hot stator electrode 160 below one side of the mirror layer 154 is possible, if limited tilt angles and control are required. Ideally the stator electrode 160 is a comb drive electrode comprising a plurality of parallel plates or fingers 161 extending parallel to the Y axis for attracting parallel plates or fingers 162 formed in the rotor electrode layer 153 generally parallel to the plates or fingers 161, particularly in the rest position. Although comb electrodes 161 and 162 are described, the micro mirror 151 is equally applicable for conventional parallel plate electrodes.

Figure 9:
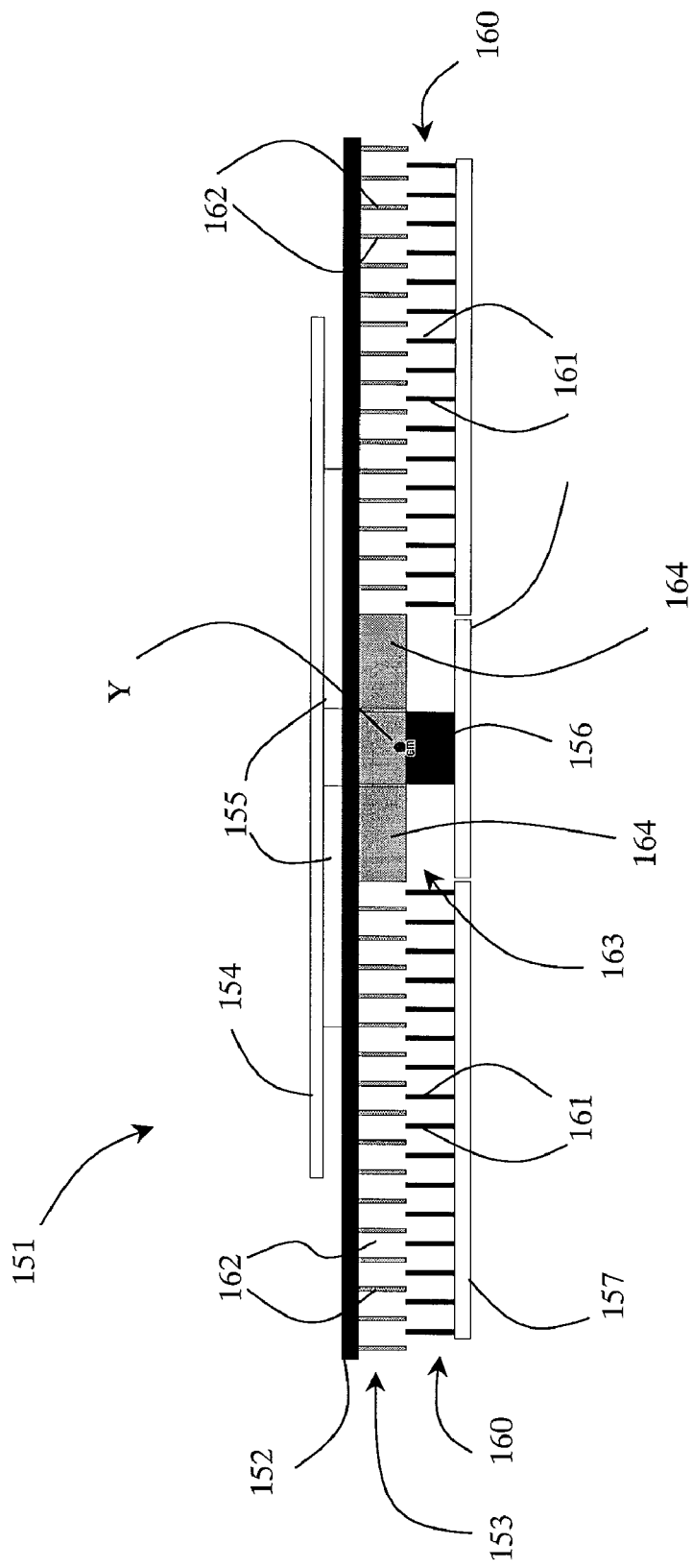
FIG. 9 is a side view of the micro mirror of FIG. 7.
Figure 10:
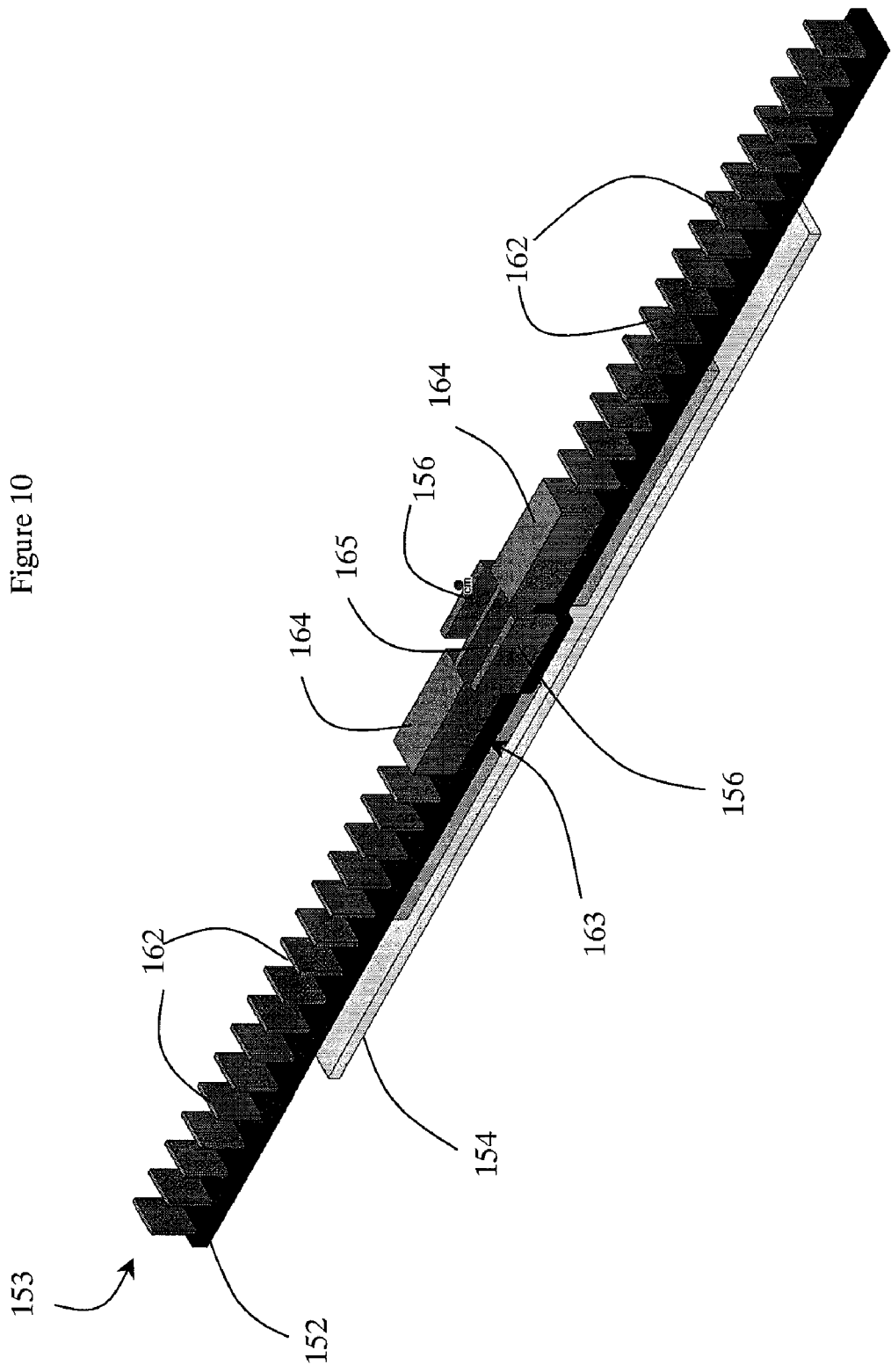
FIG. 10 is an isometric view of the micro-mirror of FIG. 7 from below.

The rotor electrode layer 153 also includes a central bulk head 163, which provides most of the counter mass, as well as the rotor electrode fingers 162. As best seen in FIGS. 9 and 10, the bulk head 163 includes a larger rectangular mass 164 extending downwardly from the hinge layer 152 on each side of the Y axis, and a thinner rectangular mass 165 extending downwardly from the narrow section 159 and between the large rectangular masses 164. Positioning the bulk head 163 in a central location results in minor increase in mass moment of inertia of the micro mirror 151, even though the overall mass of the mirror 151 increases substantially more. The hinge constant for the torsional hinges 158 needs to be increased correspondingly to account for the increase in mass of the mirror 151, and therefore the system requires a high efficiency driver, such as a comb drive, to achieve desired control over the tilt angle of the mirror 151.

In the aforementioned embodiments in FIGS. 1 and 2, which did not have distinct rotor electrode layers, the hinge layer, e.g. ground layer 26, acted as the rotor electrode with cutouts in the rotor layer instead of comb fingers hanging down from the hinge layer, which severely limits the rotor height, as hinge design typically require a relatively small thickness (<15 um) due to process and design tolerance limitations, limiting electrostatic torque and angular range as the fingers become fully engaged at relatively small tilt angle. The absence of a dedicated rotor layer also meant a narrower (out of plane) stator, since cut outs had to be made in the hinge layer to fabricate rotor fingers, further limiting electrostatic torque.

With separate rotor and hinge layers 153 and 152, respectively, the thickness of the hinge layer 152 and the thickness of the rotor layer 153 are decoupled, hence the rotor combs 162 may be much deeper, e.g. 40 µm to 60 µm, preferably 50 µm, resulting in a larger number of rotor fingers 162 at farther distances from the pivot axis before they become fully engaged, thereby increasing the available drive torque. As the rotor fingers 162 are vertically offset, i.e. in a different layer below the hinge layer 152, with respect to the hinges 158, the lateral force generated upon tilting of the rotor layer 153 provides a further increase in efficiency due to the significant contribution to useful torque. Finally, since the rotor fingers 162 are suspended from the hinge layer 152, the stator fingers 161 may be much wider. In the previous embodiment without a dedicated rotor electrode layer 153, instead of rotor fingers 162, cut outs are made in the ground layer 26 which engages with the stator fingers 23a, 23b, 24a and 24b. Accordingly, the stator teeth width (out of plane) is relatively narrow to avoid interference on the cutout side walls. In the counter mass embodiment of FIGS. 7 to 10, which has a dedicated rotor layer 153, the rotor fingers 162 hang down anchored on the hinge layer 152 above, with no side walls as in the cut out scenario, therefore the stator fingers 161 may be as wide or even wider than the rotor fingers 162, effectively increasing the electrode size, hence increasing electrostatic torque.

Figure 11C:
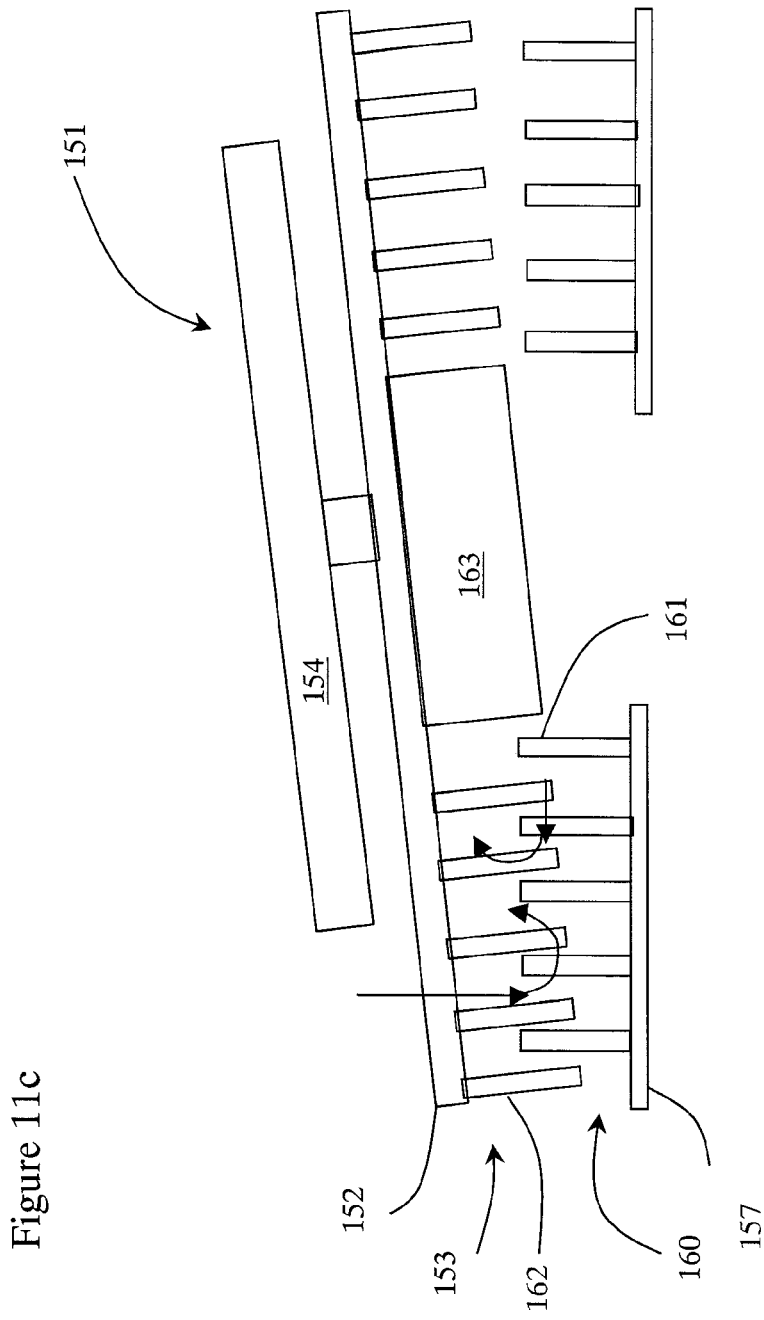
Figure 11E:
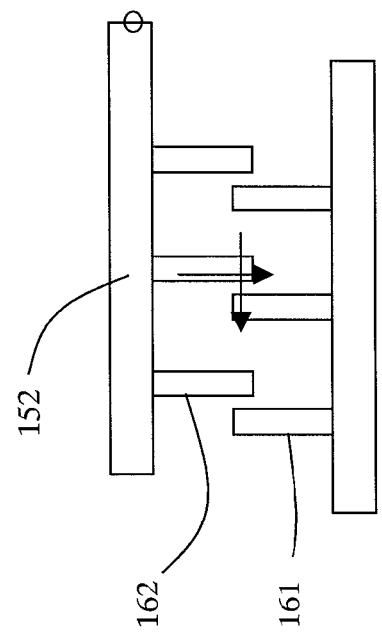
Figure 11D:
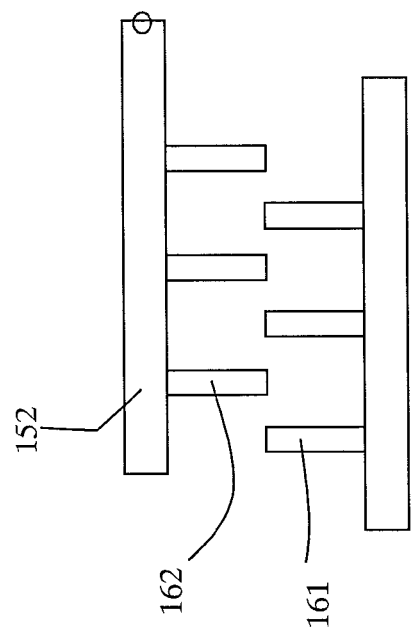

FIG. 11a illustrates the micro mirror 151 in a rest position, while FIG. 11b illustrates the micro mirror 151 in a tilted position, corresponding to a desired output port in an optical switch, after activation of the stator (hot) electrode 160 beneath one side of the hinge layer 152 to attract the rotor (ground) electrode layer 153 thereabove. The bulk head 163 counterbalances the weight of the mirror layer 154 about the tilt (Y) axis. Under a perfectly aligned configuration, as the mirror 154 tilts, the rotor fingers 162 move closer to the pivot axis Y as shown in FIG. 11b, which may be advantageous to reduce voltage as the torque due to the lateral force is adding to the main torque due to the vertical forces. Another embodiment is illustrated in FIG. 11c, in which an intentional lateral offset, i.e. positioning each stator finger 161 off center, closer to one of the adjacent rotor finger 162 than the other, is applied to the stator fingers 161 with respect to the rotor fingers 162, so that the torque due to the lateral force counters the main torque, in other words the lateral force pulls back. Such pull back scheme makes the angle change more slowly with voltage, in other words makes the comb drive relatively linear, hence improves angular resolution for a given voltage step defined by the drive DAC. There is small penalty to be paid in terms of drive voltage, which increases as a result of pull back. FIG. 11d illustrates a typical comb drive, in which the end of each rotor comb finger 162 is disposed equidistant between the ends of two of the stator comb fingers 161. FIG. 11e illustrates the "pull back" alignment, in which the end of each rotor comb finger 162 is disposed closer to one of the ends of the stator comb finger 161 than the other.

Figure 14:
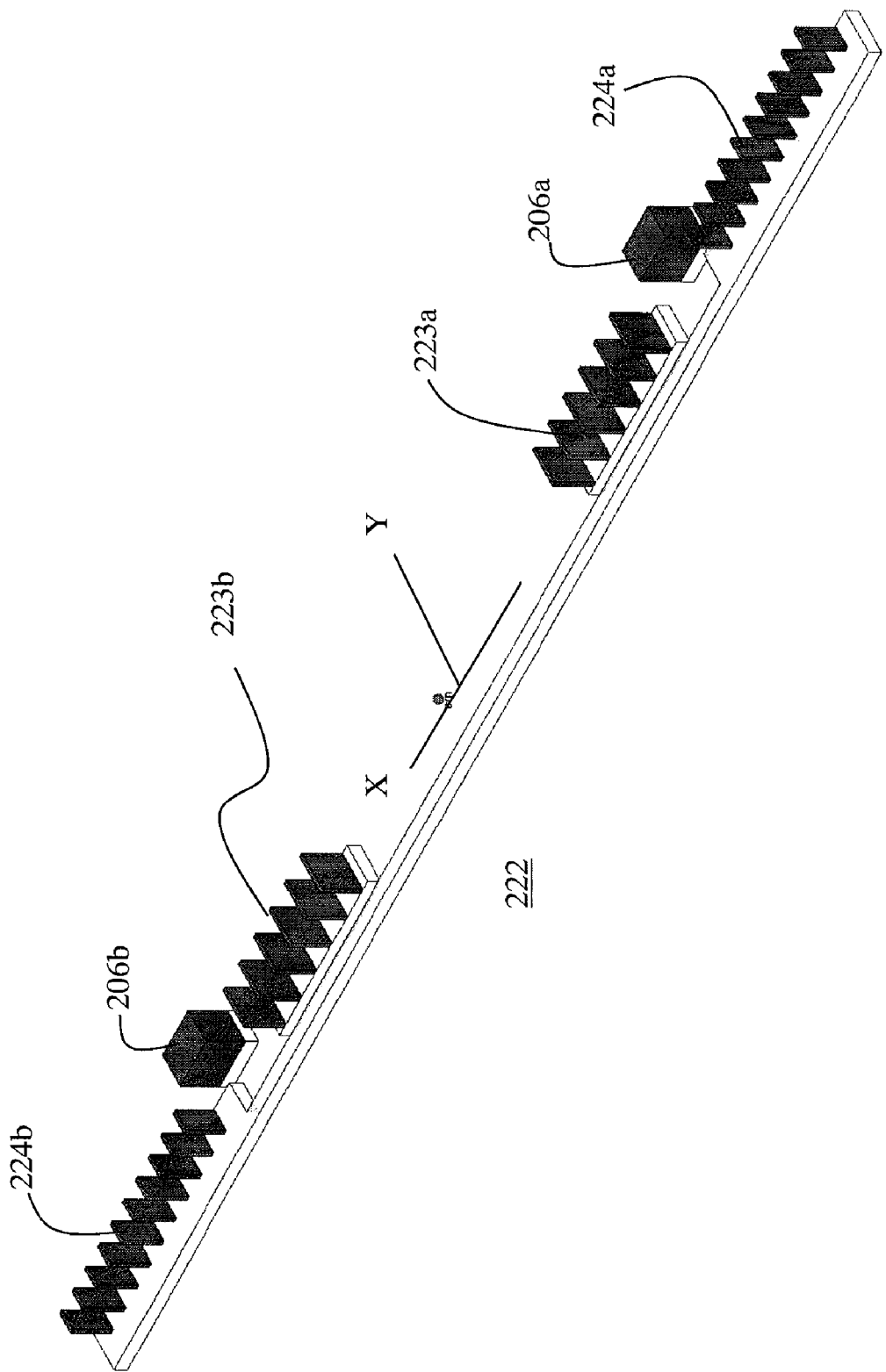
FIG. 14 is an isometric view of the stator comb electrodes of the micro mirror of FIG. 12.
Figure 15:
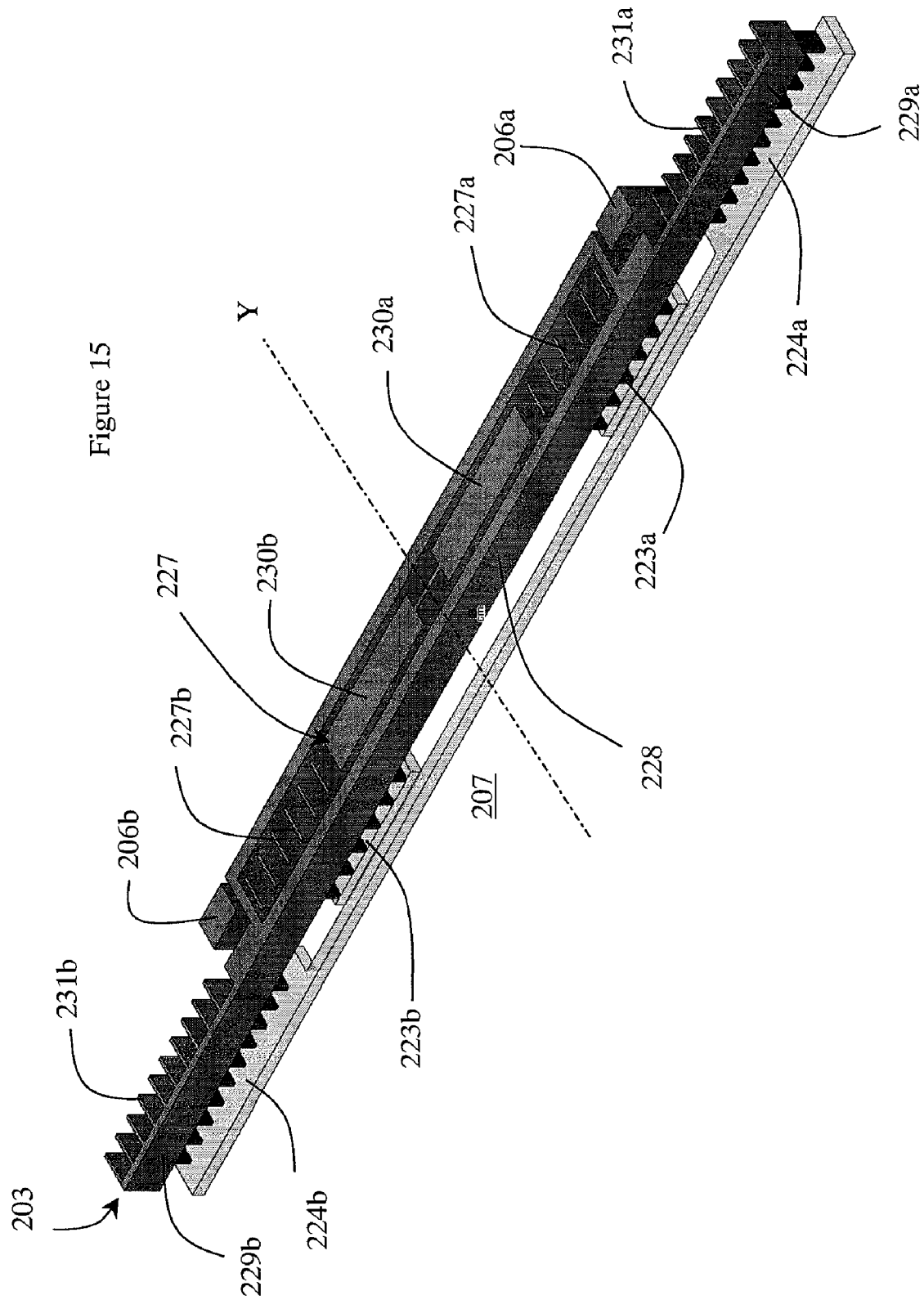
FIG. 15 is an isometric view of the stator comb electrode layer and the rotor electrode/counterbalance layer of the micro mirror of FIG. 12.
Figure 16:
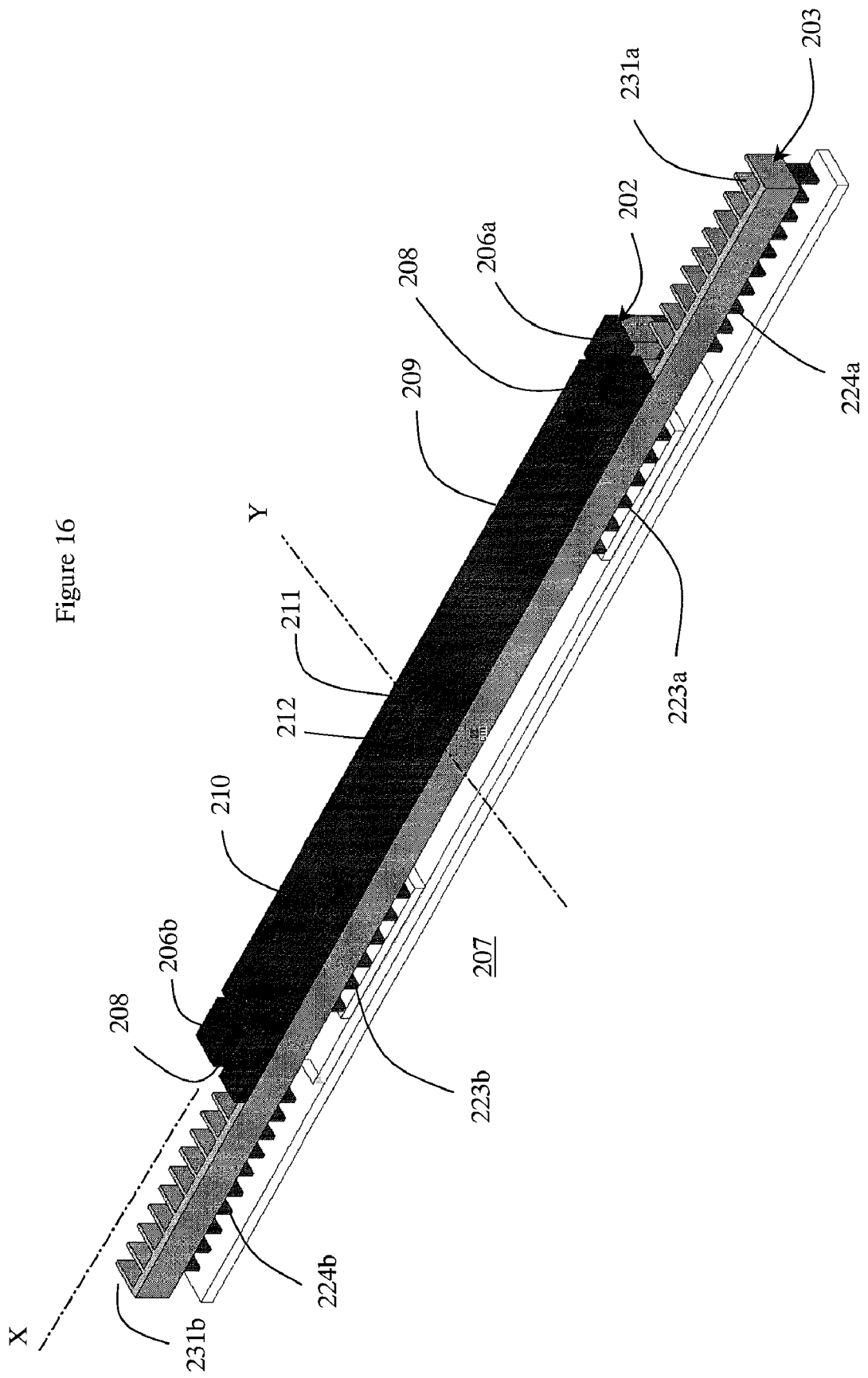
FIG. 16 is an isometric view of the stator comb electrode layer, the rotor electrode/counterbalance layer, and the hinge layer of the micro mirror of FIG. 12.

FIGS. 12 to 17 illustrate a two-dimensional micro-mirror 201, which pivots about the lateral tilt (Y) axis and pivots about the longitudinal roll (X) axis. The biaxial-tilt, hidden-hinge micro mirror 201 includes a hinge layer 202 separate from and parallel to a rotor electrode layer 203, which are both separate from a mirror layer 204. The mirror layer 204 is raised above the hinge layer 202 via pedestals 205. The hinge layer 202 is pivotally connected to first and second fixed posts 206a and 206b, which extend upwardly from a substrate 207, via torsional roll hinges 208, preferably serpentine torsional hinges, as hereinbefore described. The roll hinges 208, illustrated in FIG. 16, are formed in the hinge layer 202, and extend between the first and second fixed posts 206a and 206b and an outer gimbal frame, e.g. rectangular shaped, 209 of the hinge layer 203 defining the longitudinal roll (X) axis of the micro mirror 201. An inner tilting platform 210 is pivotally connected to the outer gimbal frame 209 via torsional tilt hinges 211, which extend from the outer gimbal frame 209 to a narrow section 212 of the tilting platform 210 defining the lateral tilt (Y) axis. The torsional tilt hinges 211, the narrow section 212, and the outer gimbal ring 209 are substantially the same width as the remainder of the hinge layer 202 and the rotor electrode and mirror layers 203 and 204, respectively, whereby several micro mirrors 201 can be positioned side by side with only a small air gap therebetween.

The multi-layer design, according to the illustrated embodiment of FIGS. 12 to 17, is implemented with vertical comb drives, instead of parallel plate electrodes. The vertical comb drives provide relatively large electrostatic torque without suffering from pull-in instability phenomenon, enabling relatively high controllable angular range. Vertical comb drives are comprised of inter-digitized sets of rotor (moving) and stator (stationary) vertically extending fingers or teeth that are offset from each other in the vertical plane. Torque is generated due to vertical electrostatic force between rotor and stator combs when a potential difference is impressed upon them.

Conventionally the rotor and stator combs are tightly spaced, e.g. 4 um apart, therefore a relatively small lateral misalignment, e.g. >1 µm, could result in an electrostatic force perpendicular to the fingers which may lead to lateral instability and collapse of the fingers. Accordingly, a precise lateral alignment, e.g. <1 µm, is normally required for the fingers, which is challenging from a fabrication view point.

Moreover, in the case of high fill factor mirror arrays, there is an added consideration of in-plane mirror rotation about the tilt hinge and possible interaction with adjacent mirrors, as lateral spacing between mirrors is typically small, e.g. between 10 µm and 5 µm or less. There is also a wavelength shift associated with such lateral mirror rotation. For small finger spacing, e.g. 4 µm, this consideration calls for even tighter finger alignment, e.g. <0.25 µm, therefore a rather complex self-aligned mask fabrication process would be required.

One possible solution to alleviate lateral interaction of fingers, and at the same time avoid complex self-align mask processes, is to increase the finger spacing, e.g. >10 µm, so that a relatively coarse misalignment, e.g. of 2 µm or less, is acceptable. However, it is highly desirable to eliminate any lateral rotation, as well as enable somewhat larger finger spacing, e.g. 6 µm to 8 µm, so that available torque is not compromised greatly.

FIGS. 14 to 16 illustrate an implementation of a multi-layer hidden hinge micro mirror device 201 in accordance with the present invention along with a vertical comb actuator. The first step is to pattern a multi-layer structure, e.g. a SOI structure, to form tilt (Y) and roll (X) stator comb electrodes 223a, 223b and 224a, 224b, respectively, which extend vertically upwardly from a substrate 222 (FIG. 14). One or two tilt stator comb electrodes 223a and 223b can be provided depending on the desired control and range of motion. The first layer is patterned so as to individually address the tilt and roll comb electrodes 223a, 223b and 224a, 224b (FIG. 14).

Preferably, the tilt stator comb electrodes 223a and 223b are disposed along the X axis, which corresponds to the longitudinal axis of the mirror 201, with each comb finger symmetrical to the X axis, i.e. the X-Z plane, and parallel to the Y axis, i.e. the Y-Z plane or the lateral axis of the mirror 201. The roll stator comb electrodes 224a and 224b are also disposed along the X axis, with the first fixed post 206a between the first roll stator comb electrodes 224a and the first tilt stator comb electrode 223a, and the second fixed post 206b between the second roll stator comb electrodes 224b and the second tilt stator comb electrode 223b. Each comb finger of the roll stator comb electrodes 224a and 224b is parallel to the Y axis, i.e. the lateral axis of the mirror 201, and perpendicular to the X axis, the longitudinal axis of the mirror 201.

The ground electrode wafer 203 is bonded at each end thereof onto the first and second fixed posts 206a and 206b of the substrate wafer 207 (FIG. 15) suspending the remainder of the ground electrode wafer 203 above the tilt and roll stator comb electrodes 223a, 223b and 224a, 224b. The ground electrode wafer 203 includes an inner, tilting rotor ground element 227, comprised of first and second structures, e.g. frames, at opposite ends thereof forming tilt rotor comb electrodes 227a and 227b. The inner tilting ground element also includes central bulk heads 230a and 230b for balancing the mass of the mirror layer 204 about the tilt (Y) axis. The bulk heads 230a and 230b are fixed to the superpositioned hinge layer 202 via the tilting platform 210. The increase in drive efficiency due to deep rotor fingers for the tilt electrodes 227a and 227b is similar to the aforementioned uniaxial case.

The tilting rotor ground comb element 227 is fixed to the tilting platform 210 and pivotable about the lateral Y axis defined by laterally extending torsional ("piano") tilt hinges 211. The tilt hinges 211 are ideally comprised serpentine beams, each with high aspect ratio, e.g. greater than ten, providing relatively low resistance to rotation about the Y-axis, but relatively higher resistance to rotation about the X-axis. The tilt stator comb electrodes 223a and 223b are disposed below the tilt rotor comb electrodes 227a and 227b, respectively, i.e. on opposite sides of the tilt hinges 211 and the Y-axis. Each of the tilt rotor comb electrodes 227a and 227b includes laterally extending cross beams defining rotor comb fingers with slots therebetween offset and interdigitated with the stator comb fingers of the tilt stator comb electrodes 223a and 223b, respectively.

An outer ground-electrode gimbal frame, e.g. rectangular shaped, 228 extends around the tilting rotor ground comb element 227, and is fixed to the outer gimbal frame 209 in the hinge layer 202. A longitudinally extending arm 229a and 229b extends from each end of the ground-electrode gimbal frame 228 forming outer roll rotor comb electrodes 231a and 231b corresponding to the roll stator comb hot electrodes 224a and 224b, which are disposed below the roll rotor ground elements 231a and 231b, respectively. Each roll rotor comb electrode 231a and 231b includes laterally extending cantilevered beams defining rotor comb fingers with slots therebetween offset from and interdigitated with the stator comb fingers of the roll stator comb electrodes 224a and 224b, respectively. Due to the longitudinally extending arms 229a and 229b, there is a lateral force component to the electro-static attraction between the roll stator comb hot electrodes 224a and 224b and the roll rotor ground electrodes 231a and 231b, in addition to the regular vertical forces, both contributing useful torque providing greater drive efficiency.

The roll hinges 208 are ideally comprised of serpentine beams, each with high aspect ratios, e.g. greater than ten, providing relatively low resistance to rotation about the X-axis, but relatively higher resistance to rotation about the Y-axis. The tilting rotor ground element 227 in the ground electrode layer 203 is fixed to the tilting platform 210 in the hinge layer 202, and the combined structure is capable of tilting independently of a combined gimbal frame structure made up of the outer gimbal frame 209 from the hinge layer 202 and the ground-electrode gimbal frame 228 about the Y-axis; however, the entire ground-electrode layer 203 along with the hinge layer 202 roll together about the X-axis via roll hinges 208. The roll hinges 208 also act as electrical connection between ground and external bond pads.

The mirror wafer 204 is patterned separately with pedestals 205, which are bonded onto the tilting platform 210. The mirror wafer 204 may have stiffening features such as ribs or bulkheads incorporated underneath. The upper surface of the mirror wafer 204 is typically coated with a highly reflective material. The inner tilting platform 210 may be integrated with the hinge layer 202 and the rotor layer 203, as explained earlier.

When a potential is applied to one of the tilt stator comb electrodes 223a or 223b relative to rotor ground electrodes 227a or 227b, respectively, the electrostatic force of attraction between the tilt stator comb electrode 223a or 223b and the corresponding tilt rotor comb electrodes 227a and 226b of the tilting rotor ground comb electrode 227 causes the tilting platform 210 and the mirror wafer 204, connected thereto, to tilt about the tilt hinges 211. Similarly when a potential is applied to the roll stator comb electrodes 224a and 224b relative to ground layer 203, the electrostatic force of attraction between the roll stator comb electrodes 224a and 224b and the roll rotor ground elements 231a and 231b, respectively, causes the mirror 204 and most of the ground and hinge layers 203 and 202, including the rolling rotor comb ground electrodes 231a and 231b and the tilting rotor ground comb element 227 to roll about the roll hinges 208, i.e. the X axis.

Figure 13:
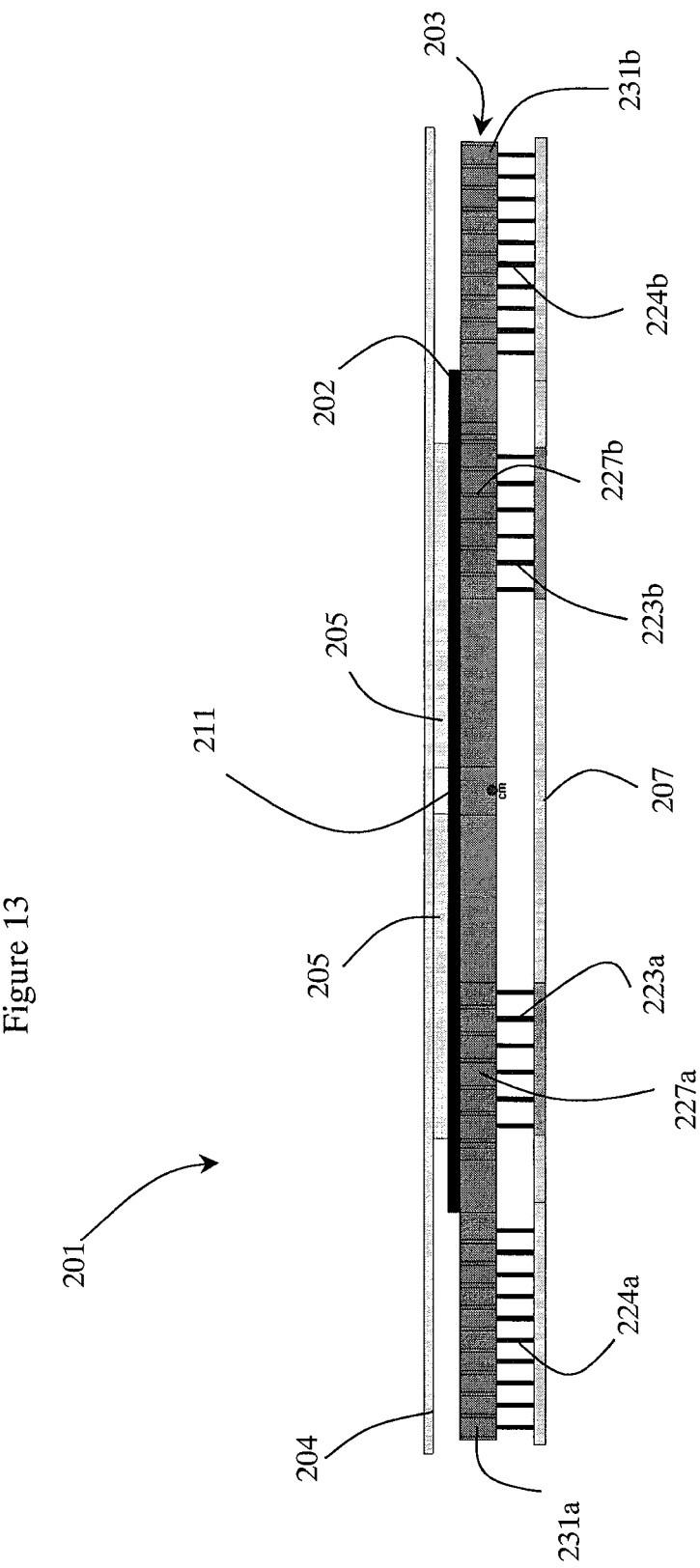
FIG. 13 is a side view of the micro mirror of FIG. 12.
Figure 17B:
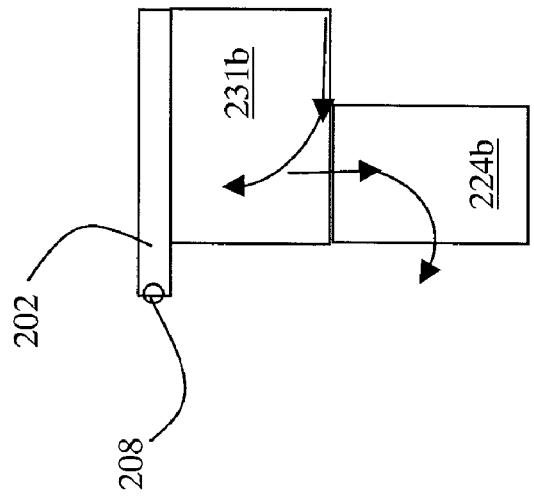
FIG. 17b is a side view of the roll stator and rotor electrodes of the micro mirror of FIG. 12.
Figure 17A:
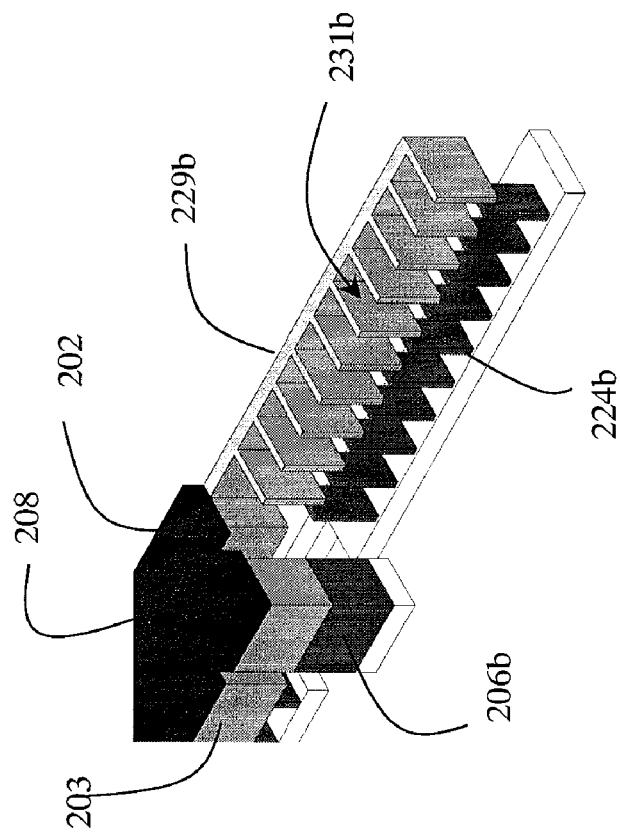
FIG. 17a is an isometric view of the roll stator and rotor electrodes, and the roll hinge of the micro mirror of FIG. 12.
Figure 17C:
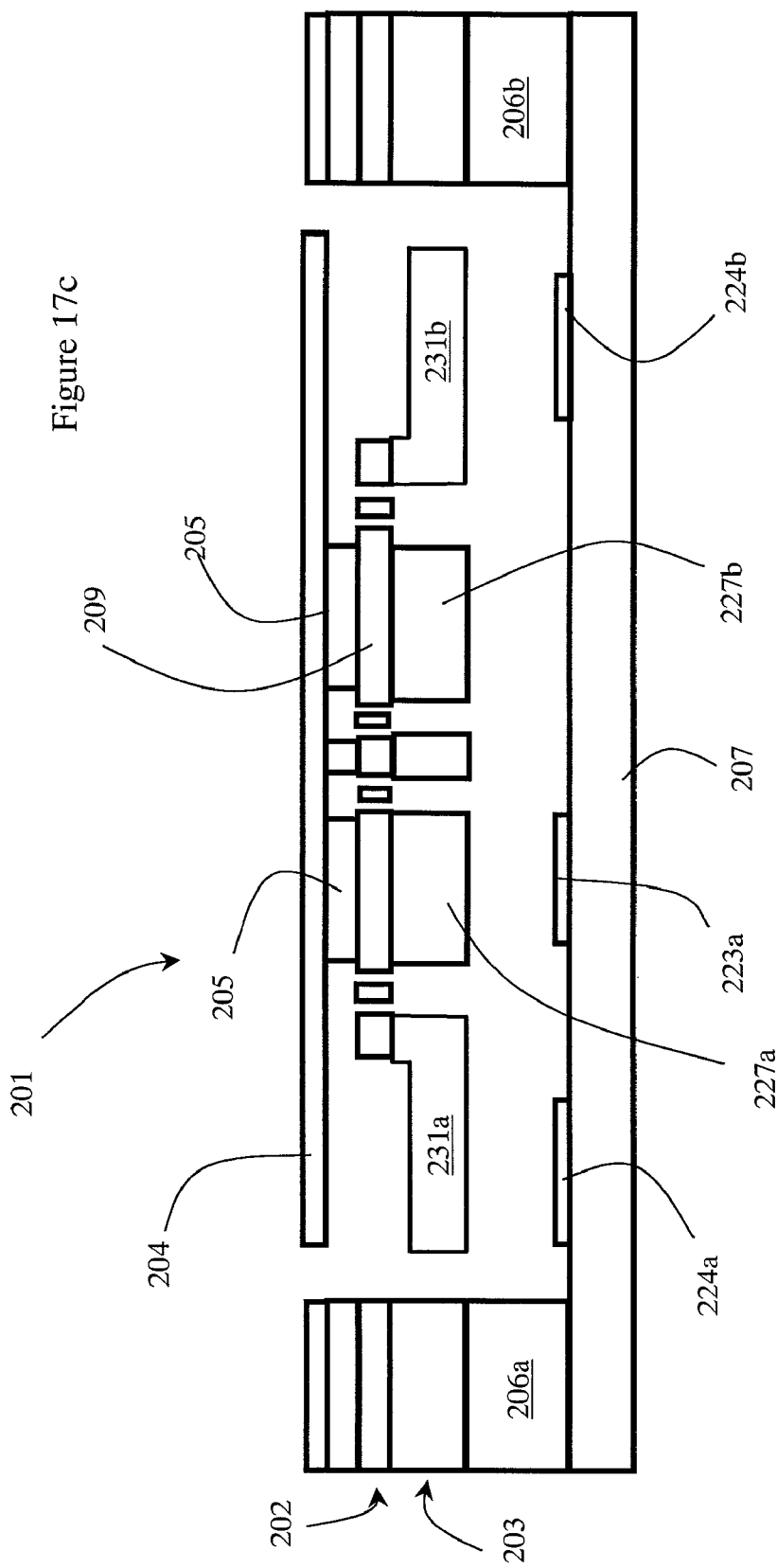
FIG. 17c is a side view of an alternative embodiment of the present invention with reduced rotor electrodes.

With reference to FIGS. 17a and 17b, another benefit of the present invention is that the hinge layer 202 can removed above the roll electrodes 231a and 231b by means of a hinge layer counter etch to the mirror etch, providing further tilt swing space between the bottom of the mirror 204 and the top of the electrode layer 203, see FIG. 13, since the gimbal frame 209, i.e. the edges of hinge layer 202, remains stationary when the mirror 204 tilts. Accordingly, a shallower and simpler mirror etch is required. Moreover, additional swing space can increase squeeze film height, and hence reduce pressure gradients due to air movements upon mirror tilt, thereby reducing aerodynamic cross talk for high fill array. The hinge etch to increase the mirror swing space has the added advantage of increasing the thickness of air space underneath the mirror (see FIG. 5 and FIG. 6), which reduces the air damping forces upon mirror movement. Such aerodynamic forces cause lateral pressure gradients, which results in adjacent mirrors being disturbed, causing an undesirable cross-talk, alleviated by the increased "squeeze" film. The hinge layer counter etch may be deeper than the hinge layer etch itself as shown in FIG. 17c, in which the ends of the hinge layer 202 are removed along with a portion of the end sections of the rotor layer 203 being reduced, thereby providing an even larger air gap between the underside the ends of the mirror 105, which moves with the highest angular velocity, and the electrode layer 203.

FIGS. 18a to 18h illustrate a method of manufacturing the aforementioned counterbalanced embodiments, in which the first three steps (FIGS. 18a, 18b and 18c), which can be performed in any order, involve forming the mirror layer 204 (154) (FIG. 18a), the substrate 207 (157) (FIG. 18b), and the rotor layer 203 (153) (FIG. 18c), each on their own SOI structures including handle wafer 251, 252 and 252, respectively. The mirror wafer 204 (154) can be formed in a single etch step to form the one or more pedestals 205 (155), as illustrated, or require two or three etches at different depths depending on the design of the stiffening features on the underside of the mirror 204 (154), as herein before described with reference to other embodiments. The mirror wafer 204 (154) includes mounting arms extending at the sides of the mirror 205 parallel to the pedestals 205 (155) to facilitate the mounting of the mirror 205 (155) on the hinge layer 202 (152). The substrate 207 (157) layer can include the posts 206a and 206b (156) along with the required stator electrodes, e.g. tilt electrode 223 (161) and/or roll electrodes 224a and 224b. The rotor layer 203 (153) can include just the tilt rotor electrodes 162, for a uniaxial device or both the tilt and roll rotor electrodes 227a, 227b, 231a and 231b for the biaxial embodiments.

The next steps (FIG. 18d) include providing the hinge layer 202 (152) on its own handle wafer 254, and bonding the hinge layer 202 (152) to the rotor layer 203 (153). The handle wafer 254 is then removed (FIG. 18e), and the rotor layer 203 (153) is masked and etched to form any combination of the tilt rotors 162, 227a, 227b, the roll rotors 231a, 231b, and the counterbalance bulk heads 163, 230a, 230b, depending on which of the aforementioned embodiments is being constructed. The ends of the hinge layer 202 can be removed by a further etching step, as hereinbefore defined with reference to FIGS. 17a and 17b. Moreover, the upper portions of the ends of the roll electrodes 231a and 231b can be removed, e.g. etched, as hereinbefore described with reference to FIG. 17c.

Figure 18A:
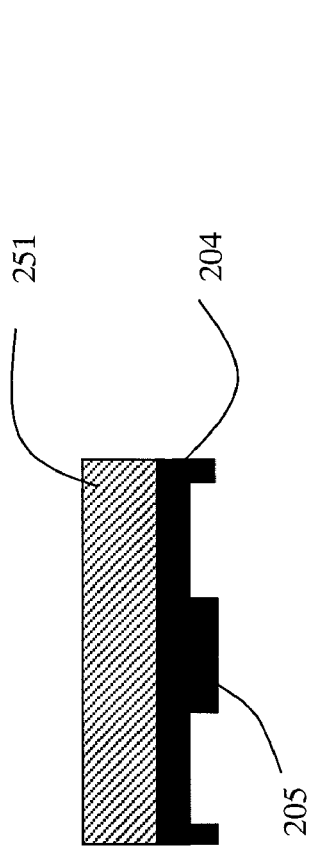
FIGS. 18a to 18h illustrate method steps in a method of manufacture in accordance with the present invention.
Figure 18B:
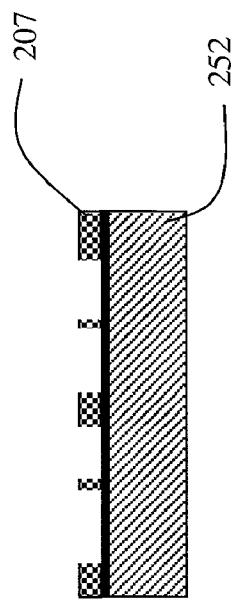
Figure 18C:
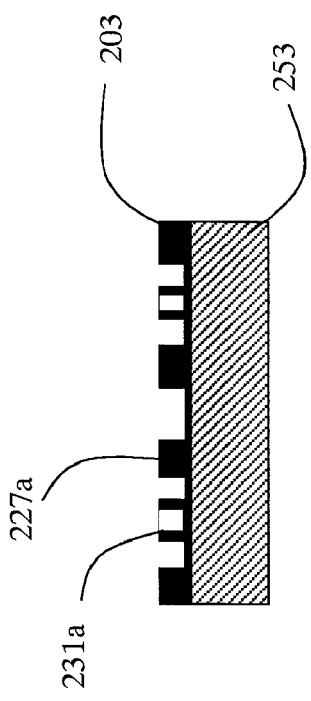
Figure 18D:
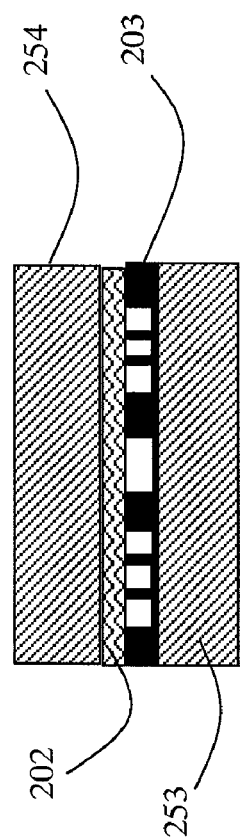
Figure 18E:
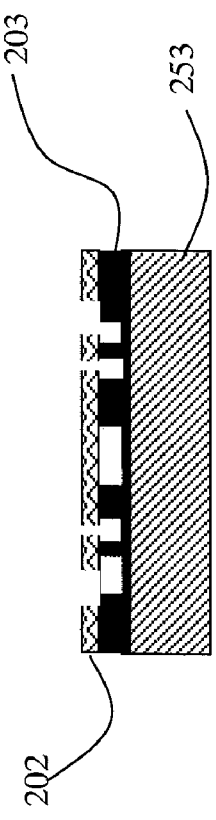
Figure 18F:
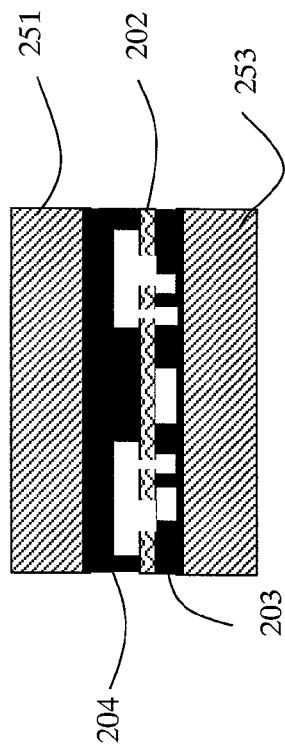
Figure 18G:
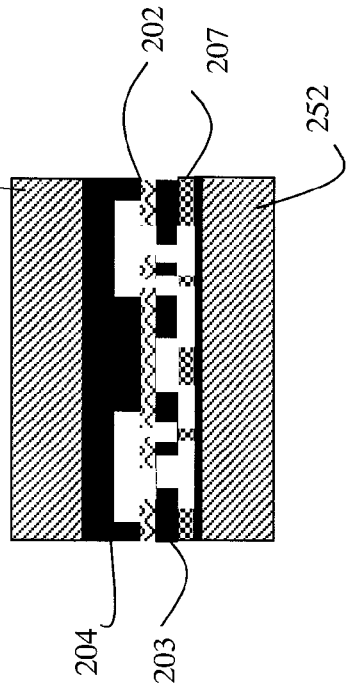
Figure 18H:
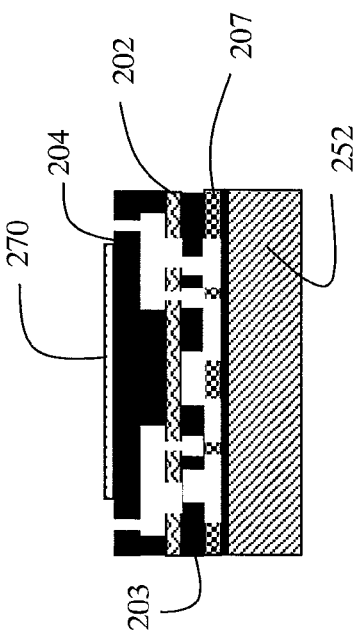

The mirror layer 204 (154) is then mounted on the hinge layer 202 (152) (FIG. 18f) with the pedestals 205 (155) fixed to the tilting platform 210 (or hinge layer 152) of hinge layer 202. The handle wafer 253 is removed, e.g. etched away, and the posts 206a and 206b (156) of the substrate layer 207 (157) are fixed to the corresponding mounting pads on the rotor layer 203 (153) (FIG. 18g). The handle wafer 251 is then removed, e.g. etched away, and the mirror 205 is separated, e.g. etched, from its mounting arms, thereby releasing the mirror 205 to pivot freely (FIG. 18h). A reflective upper coating layer 270 can be added to the upper surface of the mirror 205, if required.

I claim:

1. A micro-electro-mechanical (MEMs) device comprising:
    a substrate with first and second supports extending upwardly therefrom;
    a tilting element pivotable about a first axis;
    first hinges, defining the first axis, extending from opposite sides of the tilting element connected to the first and second supports;
    a first ground electrode connected to the tilting element;
    a pedestal extending upwardly from the tilting element;
    a reflective body mounted on the pedestal;
    a counter mass extending downwardly from the tilting element to counter balance the weight of the reflective body about the first axis; and
    a first hot electrode mounted on the substrate for attracting the first ground electrode, thereby rotating the tilting element and the reflective body about the first axis.

2. The MEMs device according to claim 1, wherein the first ground electrode and the counter mass comprise a first layer;
    wherein the tilting element and the first hinges comprise a second layer, parallel to the first layer; and
    wherein the reflective body and the pedestal comprise a third layer, parallel to the first and second layers;
    whereby the first ground electrode and the first hinges have thicknesses independent of each other.

3. The MEMs device according to claim 1, wherein the first hot electrode comprises a first electrostatic comb drive including comb fingers extending laterally parallel to the first axis; and wherein the first ground electrode comprises laterally extending beams offset with the comb fingers in the first hot electrode.

4. The MEMs device according to claim 1, further comprising:

a rolling element, surrounding the tilting element and receiving the ends of the first hinges, pivotable about a second axis perpendicular to the first axis;

second hinges, defining the second axis, extending from the rolling element, the outer ends of which are fixed to one of the first and second supports;

a second ground electrode connected to the rolling element; and a second hot electrode mounted on the substrate, for attracting the first ground electrode, thereby rotating the rolling element, the tilting element and the reflective body about the second axis.

5. The MEMs device according to claim 4, wherein the first ground electrode, the second ground electrode, and the counter mass comprise a first layer;

wherein the tilting element, the rolling element, the first hinges, and the second hinges comprise a second layer; and wherein the reflective body and the pedestal comprise a third layer, parallel to the first and second layers.

6. The MEMs device according to claim 5, wherein the rolling element comprises:

a first gimbal frame in the first layer fixed to a second gimbal frame in the second layer; and wherein the second ground electrode extends from the first gimbal frame.

7. The MEMs device according to claim 6, wherein the second ground electrode comprises an arm extending from the first gimbal frame, and electrostatic roll comb fingers extending laterally cantilevered from the arm parallel to the first axis; and wherein the second hot electrode includes fingers offset with the stator comb fingers.

8. The MEMs device according to claim 4, wherein the first hinges comprise serpentine torsional hinges with an aspect ratio greater than ten, enabling rotation of the tilting element about the first axis and resisting rotation of the tilting element about the second axis; and wherein the second hinges comprise serpentine torsional hinges with an aspect ratio greater than ten, enabling rotation of the rolling element about the second axis and resisting rotation of the rolling element about the first axis.

9. The MEMs device according to claim 4, wherein the reflective body is wider than the rolling element, whereby the reflective body can be positioned proximate a reflective body of an adjacent MEMs device with only an air gap therebetween.

10. A micro-electro-mechanical (MEMs) device comprising:

a substrate with first and second supports extending upwardly therefrom;

a tilting element pivotable about a first axis above the substrate in a first layer having a first thickness;

first hinges, defining the first axis, extending from opposite sides of the tilting element in the first layer connected to the first and second supports;

a rolling element, in the first layer surrounding the tilting element and receiving the ends of the first hinges, pivotable about a second axis perpendicular to the first axis;

second hinges, in the first layer defining the second axis, extending from the rolling element, the outer ends of which are fixed to one of the first and second supports;

a pedestal extending upwardly from the tilting element;

a reflective body mounted on the pedestal;

a first ground electrode in a second layer connected to an underside of the tilting element;

a first hot electrode mounted on the substrate for attracting the first ground electrode, thereby rotating the tilting element and the reflective body about the first axis;

a second ground electrode in the second layer connected to an underside of the rolling element; and a second hot electrode mounted on the substrate, for attracting the first ground electrode, thereby rotating the rolling element, the tilting element and the reflective body about the second axis; wherein the first and second ground electrodes in the second layer counter balance the weight of the reflective body about the first axis.

* * * * *